United States Patent [19]

Dewa et al.

[11] Patent Number: 5,522,076

[45] Date of Patent: May 28, 1996

[54] COMPUTER SYSTEM HAVING BIOS (BASIC INPUT/OUTPUT SYSTEM)-ROM (READ ONLY MEMORY) WRITING FUNCTION

[75] Inventors: Koichi Dewa; Kyoji Hayashi; Shigeru Satake, all of Tokyo, Japan

[73] Assignee: Kabushiki Kaisha Toshiba, Tokyo, Japan

[21] Appl. No.: 234,475

[22] Filed: Apr. 28, 1994

[30] Foreign Application Priority Data

May 13, 1993 [JP] Japan ..................................... 5-111738
Aug. 30, 1993 [JP] Japan ..................................... 5-213887

[51] Int. Cl.$^6$ ........................................................ G06F 9/44
[52] U.S. Cl. ................................... 395/700; 364/DIG. 1; 364/280.2
[58] Field of Search ....... 395/700; 364/DIG. 1 MS File

[56] References Cited

U.S. PATENT DOCUMENTS

| | | | |
|---|---|---|---|
| 5,187,792 | 2/1993 | Dayan et al. | 395/725 |
| 5,257,380 | 10/1993 | Lang | 395/700 |
| 5,261,104 | 11/1993 | Bertram et al. | 395/700 |
| 5,269,022 | 12/1993 | Shinjo et al. | 364/DIG. 1 |
| 5,327,531 | 7/1994 | Bealkowski et al. | 364/DIG. 1 |
| 5,388,267 | 2/1995 | Chan et al. | 398/700 |

FOREIGN PATENT DOCUMENTS 4214184  11/1992  Germany .

OTHER PUBLICATIONS

*Flash Memory Bios for PC and Notebook Computers*, Jerry Jex, Intel Corporation, IEEE Pacific Rim Conference on Communications, Computers and Signal Processing, May 9–10, 1991, pp. 692–695.

*Primary Examiner*—Thomas M. Heckler
*Attorney, Agent, or Firm*—Limbach & Limbach; Alan S. Hodes

[57] ABSTRACT

A flash memory used as a BIOS-ROM has a main block storing a BIOS and a boot block storing minimum programs executed in initializing the system. Upon a power-on operation, when a rewriting unit is connected to an expansion bus connector, a new boot block stored in a ROM of the rewriting unit is written in the flash memory. Upon the power-on operation, a key depression detecting routine in the boot block is executed to check whether a predetermined key is depressed. If the predetermined key is determined to be depressed, a rewriting program in a floppy disk is loaded in the system and executed, thereby rewriting the content of the main block into the BIOS file stored in the floppy disk.

16 Claims, 13 Drawing Sheets

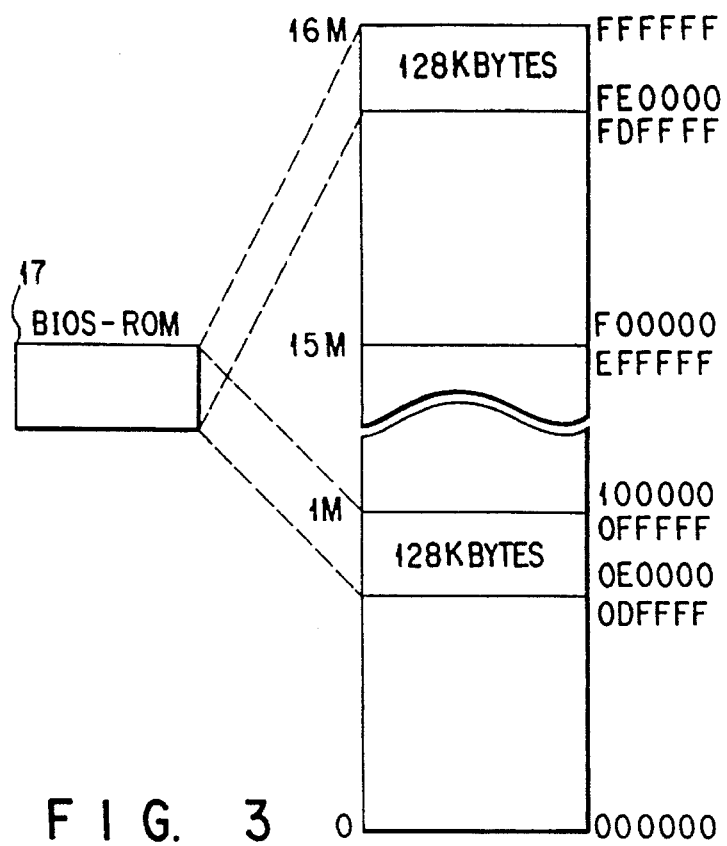
F I G. 3
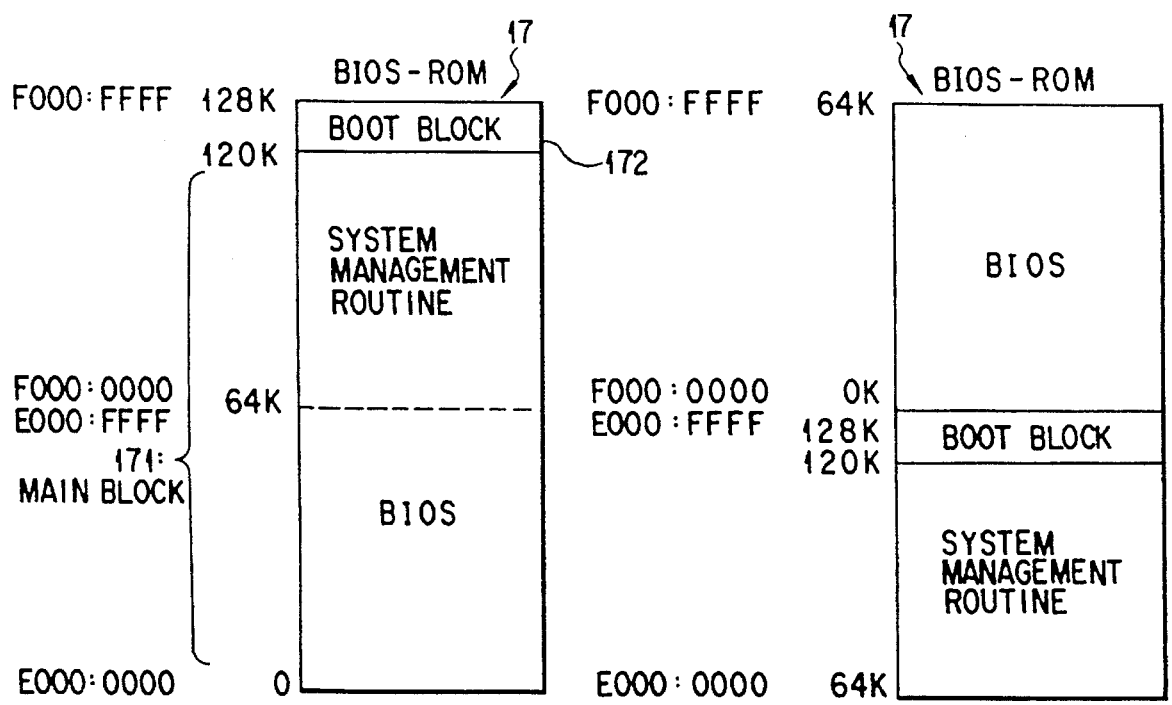
F I G. 4A   F I G. 4B

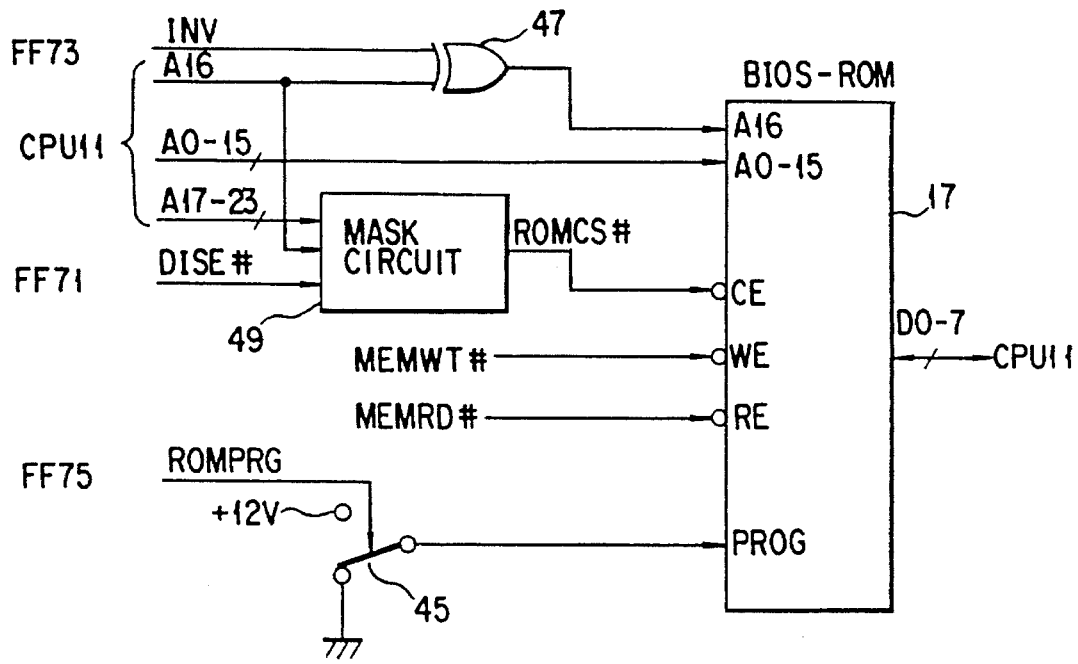
F I G. 5
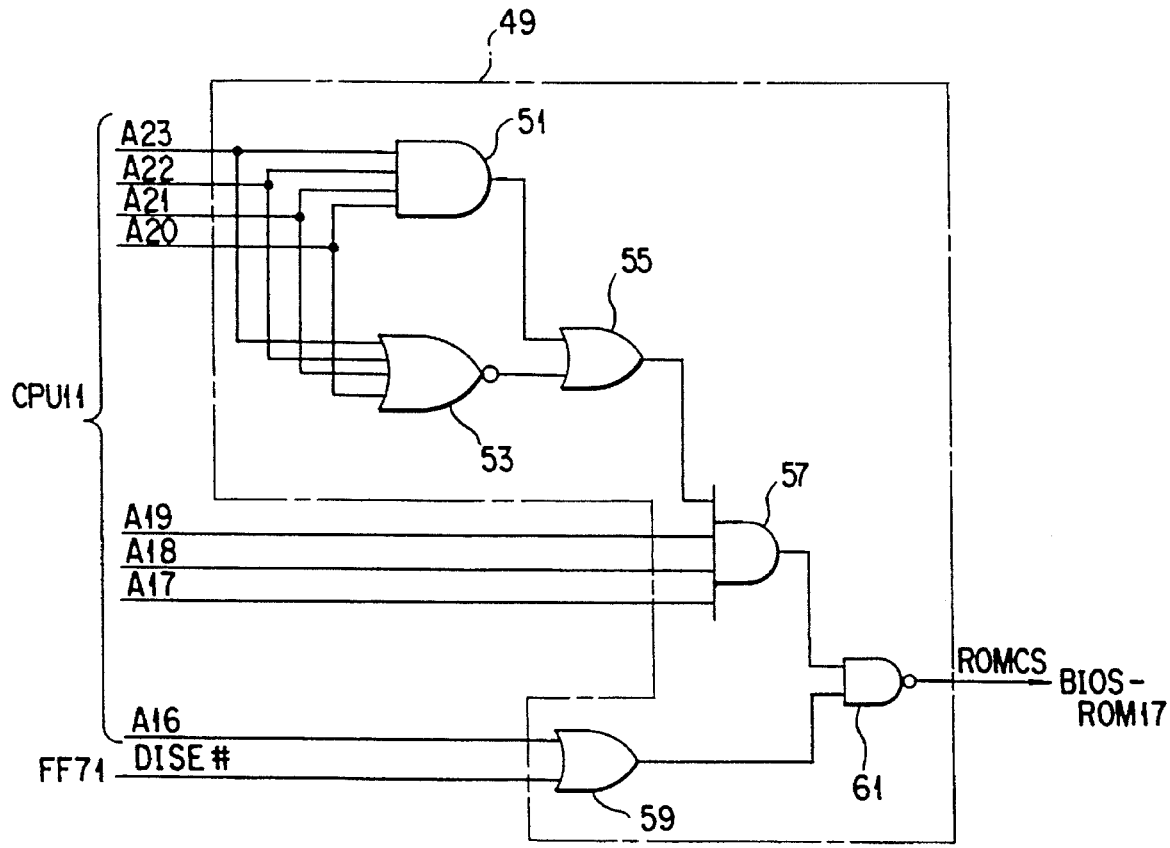
F I G. 6

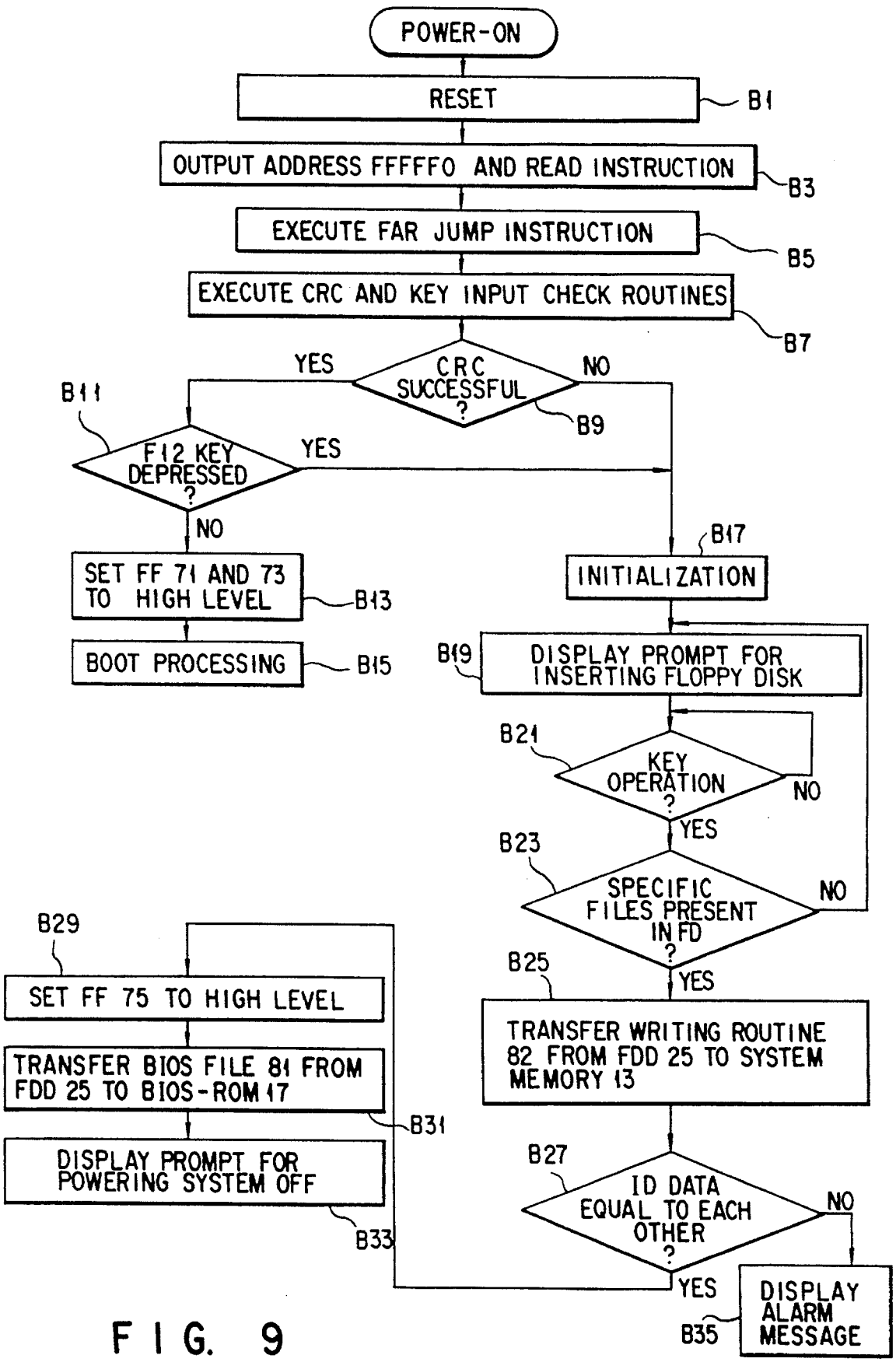
F I G. 9

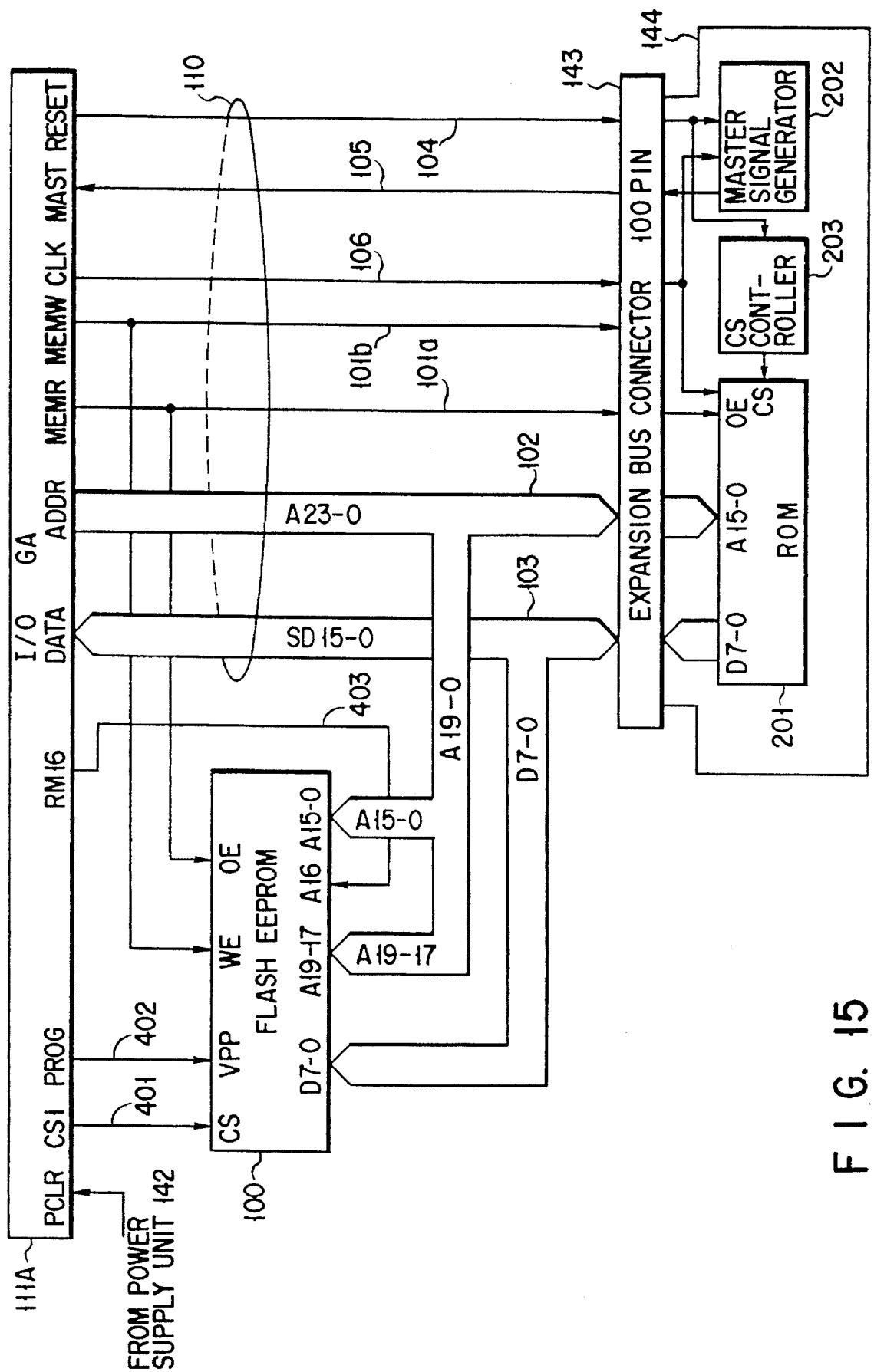
F I G. 15

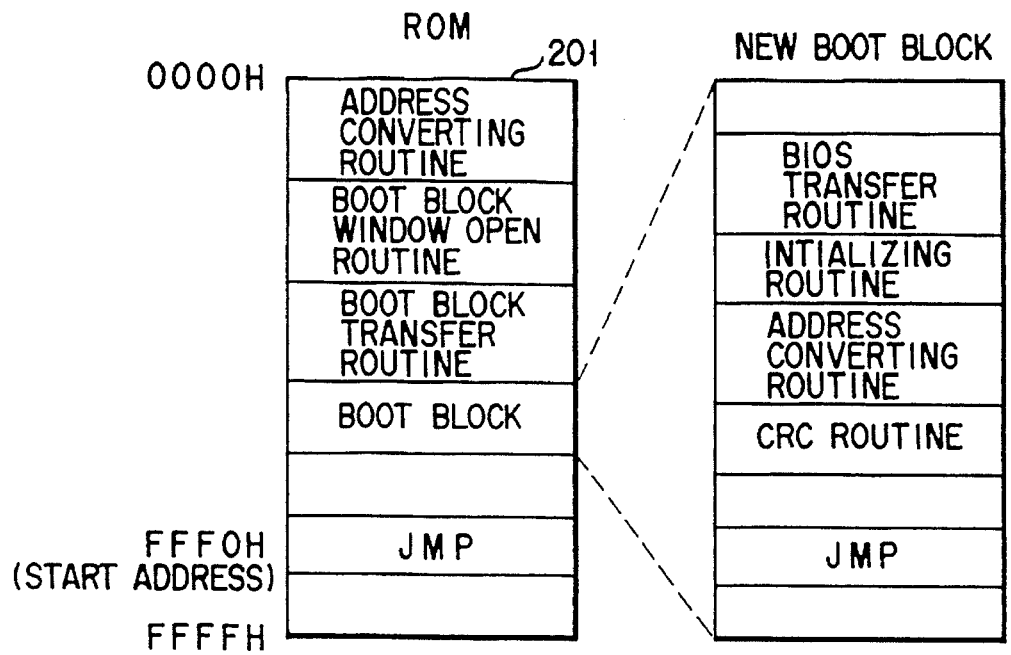
F I G. 16
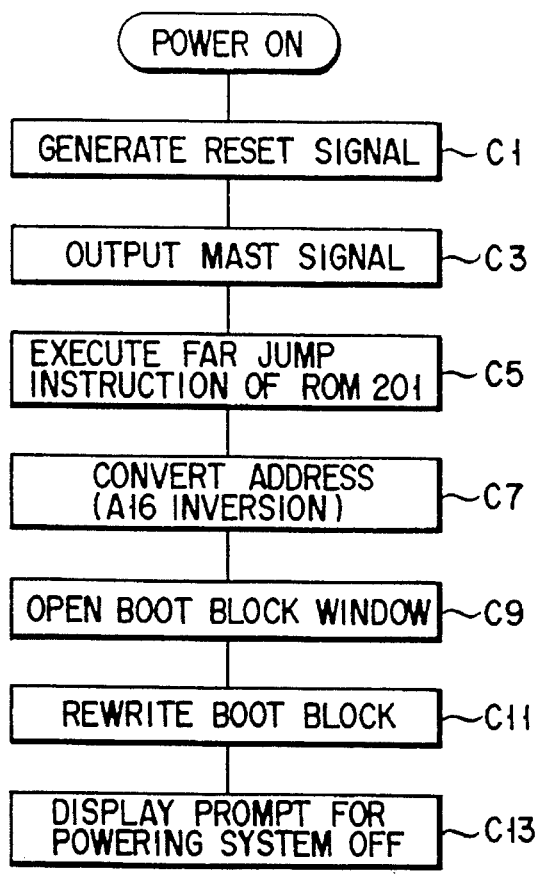
F I G. 18

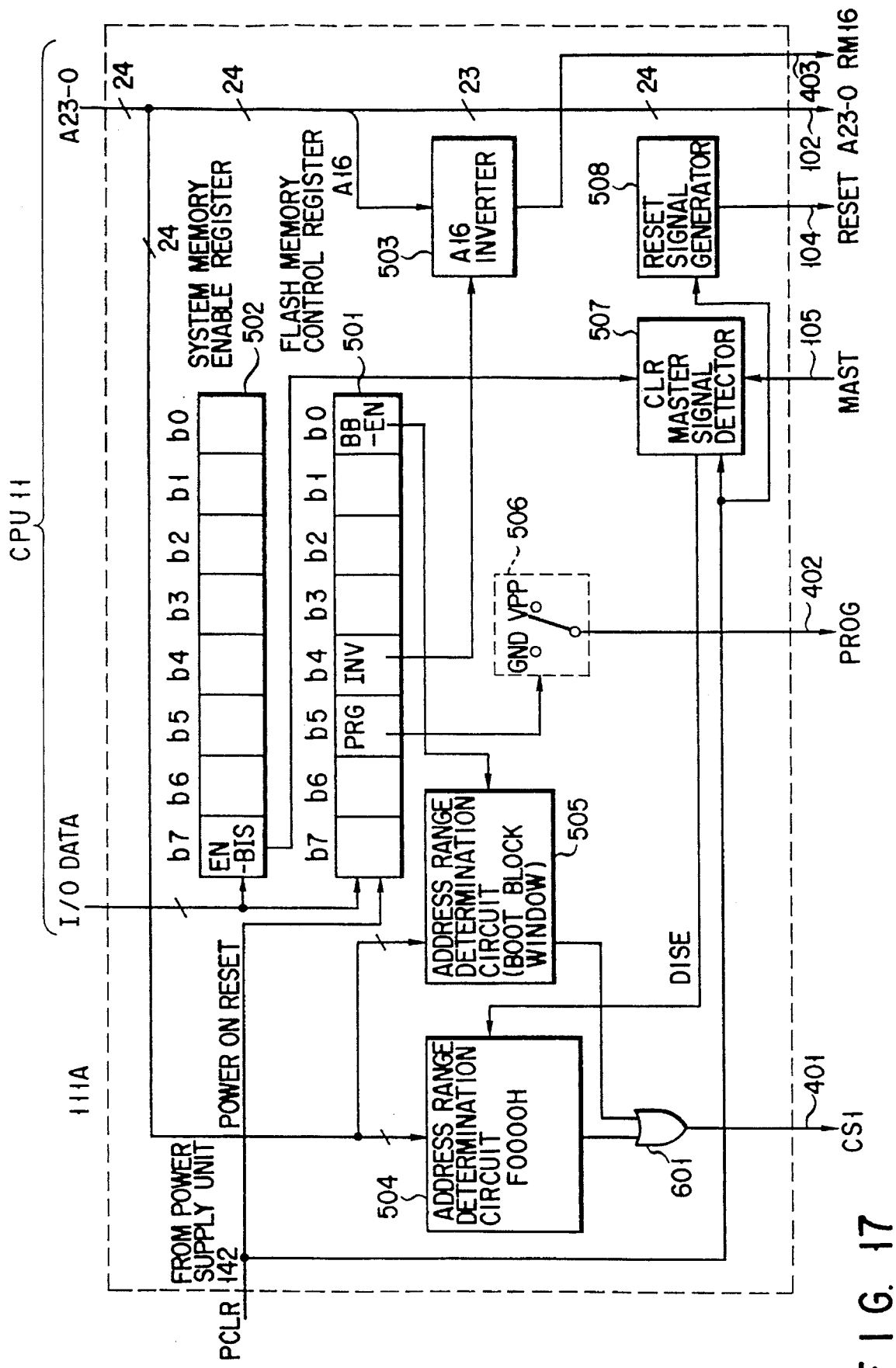
F I G. 17

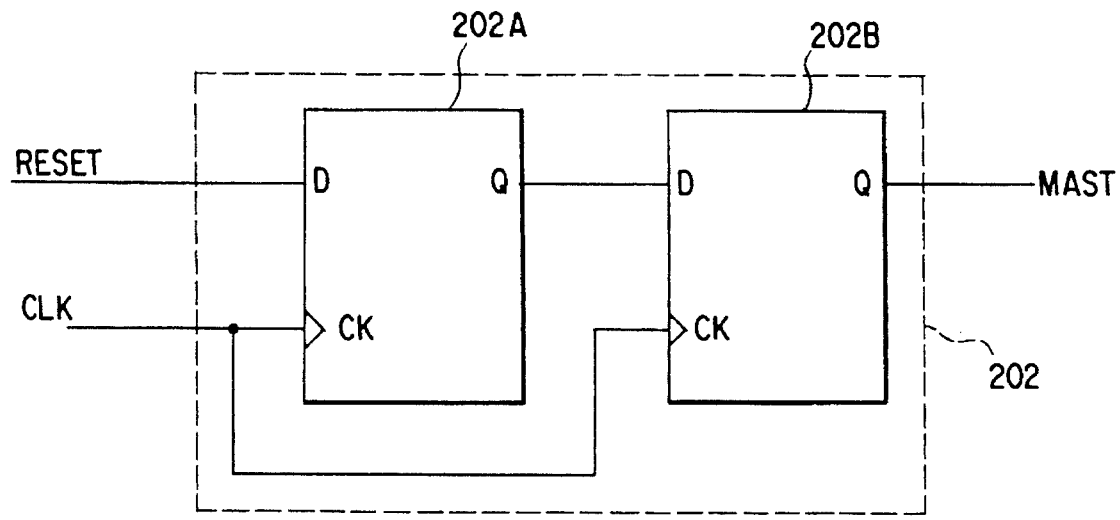
F I G. 19
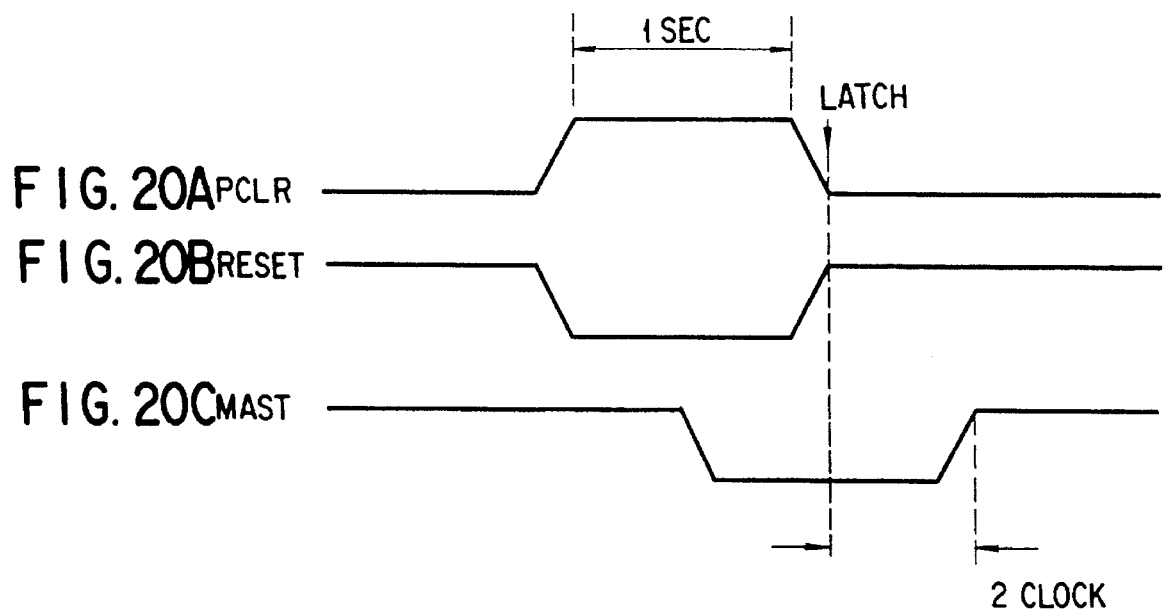
F I G. 20A PCLR
F I G. 20B RESET
F I G. 20C MAST

COMPUTER SYSTEM HAVING BIOS (BASIC INPUT/OUTPUT SYSTEM)-ROM (READ ONLY MEMORY) WRITING FUNCTION

BACKGROUND OF THE INVENTION

1. Field of the Invention

The present invention relates to a computer system using a programmable ROM such as a flash EEPROM (Electrically Erasable and Programmable Read Only Memory) as a BIOS-ROM and, more particularly, to a computer system having a rewriting function using a rewriting floppy disk or a computer system capable of executing rewriting upon connecting a dedicated unit to a bus.

2. Description of the Related Art

A computer system such as a personal computer generally has a system ROM (Read Only Memory) for storing a BIOS (Basic Input/Output System). When the contents of this system ROM are destroyed or to be upgraded, this system ROM must be replaced with a new or corresponding one.

In recent years, a flash EEPROM (Electrically Erasable and Programmable Read Only Memory) is developed as a programmable ROM. This flash EEPROM has various advantages including one that storage data can be erased in units of blocks. For this reason, a configuration using this flash EEPROM as a system ROM to rewrite the BIOS has recently been employed.

In a system using such a flash EEPROM, to rewrite the BIOS, a BIOS rewriting utility is loaded from a floppy disk to the main memory upon bootstrap of the operating system. This system is disclosed in a U.S. Ser. No. 07/958,556 filed Oct. 8, 1992 by the same applicant.

When the flash EEPROM is used as a system ROM as described above, the BIOS can be rewritten on-board even after the shipment of a computer product. More specifically, to rewrite the BIOS held in the system ROM, the user need not open the housing of the computer unit which incorporates the BIOS-ROM nor replace a chip holding the old BIOS with a new chip. Therefore, when a flash EEPROM as a rewritable ROM is applied to the BIOS-ROM, BIOS revision can be facilitated.

A BIOS rewriting process is based on an assumption that a system such as a personal computer is normally initialized and set in a BIOS rewriting process utility execution state. The computer initialization processing, i.e., OS (Operating System) bootstrapping can be performed by executing a boot routine in the BIOS.

When the contents of the BIOS are destroyed, the operating system itself cannot be bootstrapped, and the BIOS rewriting utility cannot be executed. The BIOS contents may be destroyed by hardware faults or a power-OFF operation during the BIOS rewriting process.

Particularly, in recent years, a user can download a BIOS compatible with his own computer system or an upgraded BIOS to his own floppy disk through personal computer communication. The user can freely rewrite the BIOS using this floppy disk. In this manner, under circumstances wherein the user can freely rewrite the BIOS without using any special device, the BIOS may be destroyed during the rewriting process due to some reason such as accidental power-OFF.

When the BIOS is destroyed, it cannot be rewritten, and the contents of the BIOS cannot be repaired. In this case, the user must replace the flash EEPROM storing the BIOS with a new one storing the normal BIOS.

A trouble may also occur when a failure occurs in a boot-block program, but not in the BIOS stored in the flash EEPROM due to the following reason. The boot block of the flash EEPROM should be executed first in initializing the system. When the contents of the boot block are destroyed, various processes such as BIOS content check cannot be performed. In addition, the system cannot be bootstrapped. Therefore, when the contents stored in the flash EEPROM used as the BIOS-ROM are destroyed, the flash EEPROM itself must be replaced.

SUMMARY OF THE INVENTION

It is an object of the present invention to provide a computer system for repairing a program on-board without replacing a flash EEPROM used as a BIOS-ROM with a new one even under the circumstances wherein the contents of a BIOS or boot-block area are destroyed to disable bootstrapping of the system.

In order to achieve the above object, according to the first aspect of the present invention, there is provided a computer system comprising: a programmable internal memory for storing a program group executed to bootstrap the system; external memory means having a repairing program for repairing the program group; and control means for executing the repairing program in the external memory means to control and repair the program group in the internal memory upon a power-on operation when a failure occurs in the program group to disable normal bootstrapping of the system.

In the above arrangement, when some failure occurs in the internal memory, e.g., the EEPROM used as a system ROM to prevent bootstrapping of the computer system, the program in the external memory is executed first when the computer system is powered on. The program for repairing various programs in the internal memory is stored in this external memory. Upon executing this repairing program, the programs in the internal memory are repaired. In this manner, even if a failure occurs in the internal memory to interfere bootstrapping of the computer system, the internal memory need not be replaced, and the various programs can be repaired on-board because the programs in the internal memory can be repaired.

It is the second object of the present invention to provide a computer system capable of forcibly executing a BIOS rewriting utility to rewrite the BIOS on-board even if the BIOS is destroyed and the system cannot be bootstrapped.

It is the third object of the present invention to provide a computer system having a function of receiving a command from a user in bootstrapping the system and rewriting a BIOS in accordance with the command from the user.

In order to achieve the second and third objects, according to the second aspect of the present invention, there is provided a computer system comprising: a keyboard, having a plurality of keys, for receiving various instructions; a main memory arranged in a computer system main body; a first memory having a first memory area for storing a boot program for bootstrapping the computer system and various basic input/output programs for controlling hardware, and a second memory area for storing a key depression detecting program for detecting depression of a predetermined key of the keyboard and a load program for loading a program for rewriting the first memory area; a second memory storing a rewriting program for rewriting a content of the first memory area and capable of being inserted into the computer system main body; key depression detecting means for executing the key depression detecting program in the second memory area upon a power-on operation of the computer system to detect depression of the predetermined key of the keyboard; boot means for executing the boot program in the first memory area when the key depression detecting means does not detect the depression of the predetermined key; load means for executing the load program in the second memory area to load the rewriting program from the second memory to the main memory when the key depression detecting means detects the depression of the predetermined key; and rewriting means for executing the rewriting program loaded in the main memory to rewrite the content of the first memory area.

In this arrangement, the EEPROM used as the system ROM has the first memory area as a target object rewritten by the rewriting program and the second memory area not subjected to the rewriting. The key depression detecting program stored in the second memory area is executed upon a power-on operation. When the key depression detecting program is executed, the presence or absence of depression of the predetermined key for designating rewriting of the first memory area is determined. If the predetermined key is not depressed, the boot program in the first memory area is executed to bootstrap the operating system. However, when the depression of the predetermined key is detected, the load program stored in the second memory area is executed prior to execution of the boot program in the first memory area. When this load program is executed, the rewriting program is forcibly loaded from the external memory and executed. As a result, the contents of the second memory area are rewritten.

As described above, the rewriting program can be forcibly executed upon depressing the predetermined key. For this reason, even if the contents of the programmable first memory area are destroyed to disable bootstrapping of the system, the contents of the first memory area can be repaired on-board.

It is the fourth object of the present invention to provide a computer system, connected to a dedicated unit, capable of repairing a program on-board, even if a program to be executed first is destroyed.

In order to achieve the fourth object, according to the third aspect of the present invention, there is provided a computer system comprising: a system bus for transmitting various data and an address; a memory including a boot area which is mapped to a first predetermined address range of a system address space and stores a program group executed in bootstrapping the computer system; a memory unit, having a memory area mapped to the same first address range as that of the boot area and detachable from the system bus, the memory area storing a rewriting program for repairing a content of the boot area; detecting means for detecting that the memory unit is connected to the system bus; means for disabling access to the memory when the detecting means detects that the memory unit is connected to the system bus; means for accessing the memory unit on the basis of an address for designating the boot area, executing the rewriting program, and repairing the content of the boot area; and remapping means for remapping the boot area of the memory to a second predetermined address range different from the first address range to enable access to the memory on the basis of the second address range.

In this arrangement, when the memory unit is connected to the memory bus, access to the memory (EEPROM) is disabled. When a system address belonging to the first address range is issued, this address is sent to the memory unit through the system bus without any modification, thereby accessing the memory area of the memory unit. For this reason, the rewriting program stored in the memory unit is executed to start a process for rewriting the boot area. In this case, the boot area of the memory is remapped to the second address range so that the memory unit and the address range do not overlap each other. The boot area is write-accessed through the second address range. Therefore, even if the boot area which stores the program to be executed first in bootstrapping the system is destroyed, the contents of the boot area can be repaired without replacing the memory (flash EEPROM).

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 3 is a memory map for explaining an address space area allocated to the BIOS-ROM of the first embodiment;

FIG. 4A is a view showing the relationship between the address space allocated to the BIOS-ROM and the area in the BIOS-ROM immediately after a power-on operation of the computer system;

FIG. 4B is a view showing the relationship between the address space allocated to the BIOS-ROM and the area in the BIOS-ROM during an operation of the computer system;

FIG. 5 is a block diagram showing a hardware arrangement for controlling an address allocated to the BIOS-ROM of the first embodiment;

FIG. 6 is a block diagram showing the arrangement of a mask circuit shown in FIG. 5;

FIG. 9 is a flow chart for explaining the operation shown in FIG. 8 in detail;

FIG. 15 is a block diagram showing the hardware arrangement near the flash EEPROM of the second embodiment and the arrangement of a boot-block rewriting unit arranged in this system;

FIG. 16 is a view showing the storage contents of a ROM arranged in the boot-block rewriting unit in FIG. 15;

FIG. 17 is a diagram showing a circuit arrangement for controlling a flash EEPROM arranged in the system of the second embodiment;

FIG. 18 is a flow chart for explaining an operation of the second embodiment;

FIG. 19 is a diagram for explaining the arrangement of a master signal generator shown in FIG. 15; and FIGS. 20A to 20C are timing charts for explaining the generation timing of a master signal (MAST) and the latch timing of the master signal, in which FIG. 20A shows the timing of a power-on reset signal (PCLR), FIG. 20B shows the timing of a system reset signal (RESET), and FIG. 20C shows the timing of the master signal.

DETAILED DESCRIPTION OF THE PREFERRED EMBODIMENTS (First Embodiment)

The first embodiment of the present invention will be described with reference to the accompanying drawings.

Figure 1:
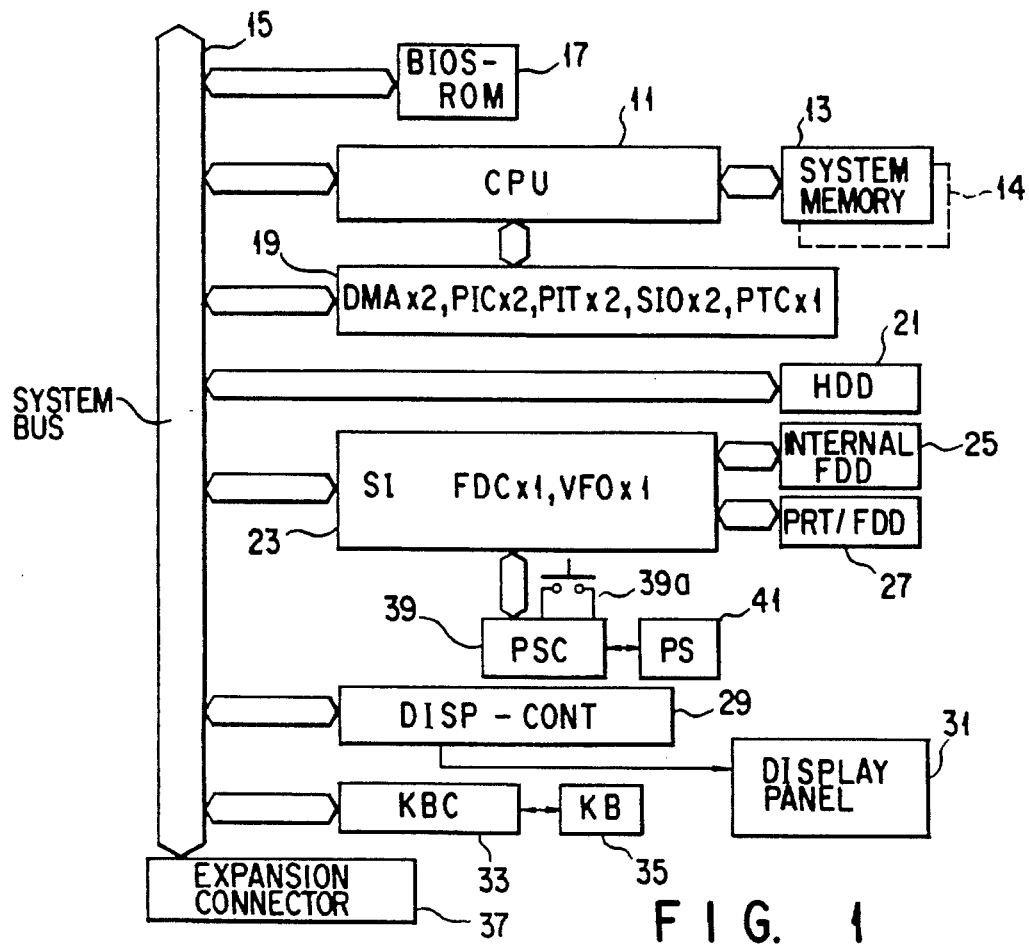
FIG. 1 is block diagram showing the arrangement of a computer system according to the first embodiment of the present invention.

FIG. 1 shows the arrangement of a personal computer system according to an embodiment of the present invention. This personal computer is a portable computer and comprises a CPU (Central Processing Unit) for controlling the overall computer system. A CPU 11 can comprise a chip having an arrangement and functions equivalent to an 80486SL available from Intel. Corp.

A system memory 13 is connected to the CPU 11 through a local bus. This system memory 13 is used as the main memory of this personal computer system. The system memory 13 holds programs and data which serve as processing targets. In this embodiment, the system memory 13 has a standard memory capacity of 2 Mbytes. The system memory 13 can be expanded to a maximum of 18 Mbytes by connecting an expansion memory to an expansion slot 14.

The CPU 11 is connected to a system bus 15. This system bus 15 is used to transfer address data, data, and control data.

A BIOS-ROM 17 for storing a BIOS (Basic Input/Output System) and the like is connected to the system bus 15. This BIOS-ROM 17 is constituted by a flash EEPROM (to be referred to as a flash memory hereinafter). The details of the BIOS-ROM 17 will be described with reference to FIGS. 2 to 4B.

A Super Integration IC (SI) 19 is also connected to the system bus 15. This SI 19 incorporates two DMA (Direct Memory Access) controllers for controlling direct memory access, two programmable interrupt controllers (PICs), two programmable interrupt timers (PITs), two serial input/output interfaces (SIOs), and one real-time clock (RTC). This SI 19 can comprise an 2360SL available from Intel.

A hard disk drive (HDD) 21 and a Super Integration IC (SI) 23 are connected to the system bus 15. The hard disk drive (HDD) 21 has an IDE (Integrated Device Electronics) interface and is directly access-controlled by the CPU 11. This 2.5" hard disk drive (HDD) 21 has a memory capacity of 120 Mbytes/200 Mbytes.

The Super Integration IC (SI) 23 incorporates a floppy disk controller (FDC) for controlling a floppy disk drive and a variable frequency oscillator (VFO) for generating an FDC clock. This SI 23 can comprise a T9920 available from TOSHIBA CORP.

The SI 23 is connected to a floppy disk drive (internal FDD) 25 as a standard floppy disk drive in the computer. An external floppy disk drive or printer (PRT/FDD) 27 is connected to the SI 23, as needed. In addition, a power supply controller (PSC) 39 for controlling a system power supply 41 is connected to the SI 23. The PSC 39 has a switch 39a and outputs a power-on reset signal when the system is powered on using this switch 39a.

A display controller (DISP-CONT) 29 is connected to the system bus 15. This display controller 29 controls to display information on a display panel 31 of an LCD (Liquid Crystal Display) or the like.

A keyboard controller (KBC) 33 is connected to the system bus 15. This keyboard controller 33 scans the key matrix of a keyboard (KB) connected to the keyboard controller 33, receives a signal corresponding to a depressed key, and converts this signal into a predetermined key code. This key code is transmitted to the CPU 11 through the system bus 15 in accordance with handshake serial communication.

An expansion connector 37 is connected to the system bus 15. An expansion unit (expansion board) for expanding the functions can be connected to this expansion connector 37.

The arrangement of the BIOS-ROM 17 and a memory space (address space) allocated to this BIOS-ROM 17 will be described with reference to FIGS. 2 to 4B.

Figure 2:
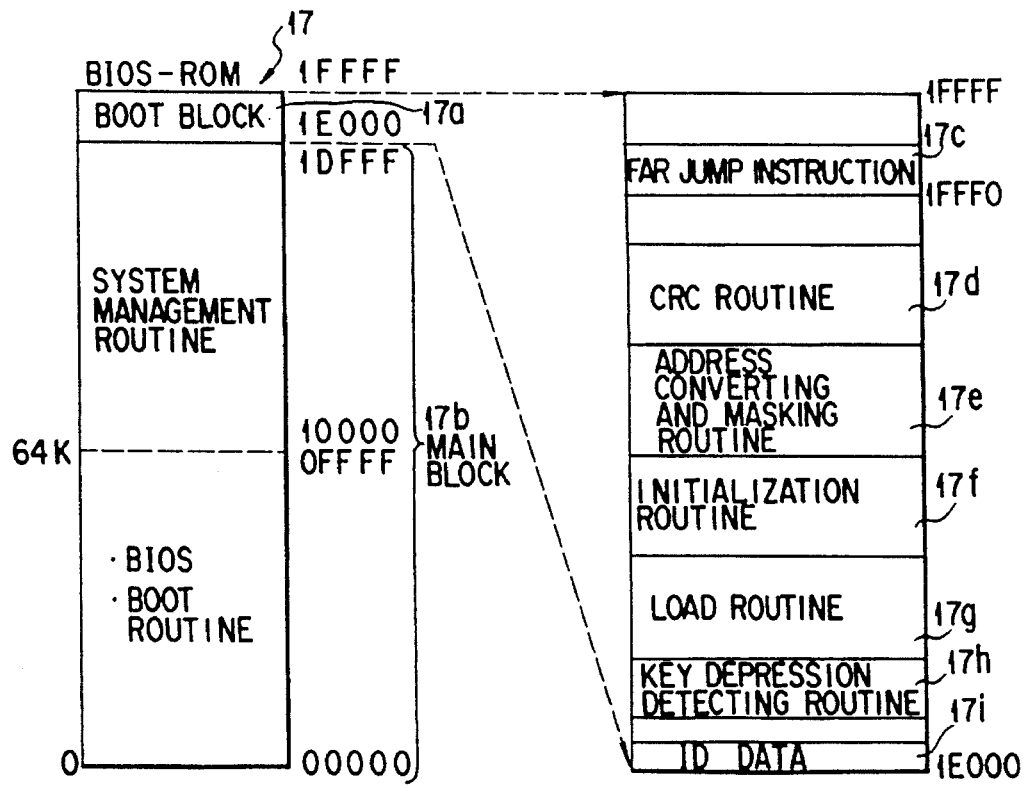
FIG. 2 is a block diagram showing the contents of data stored in a BIOS-ROM shown in FIG. 1.

The BIOS-ROM 17 comprises a flash memory having a memory capacity of 8 bits×128 k, i.e., 128 kbytes. As shown in FIG. 2, the first 120-kbyte area of the BIOS-ROM 17, i.e., an area from physical addresses 00000H to 1DFFFH serves as a main block 17a to be written by a BIOS rewriting program (to be described later). Note that a suffix "H" represents hexadecimal notation. In the following expressions concerning addresses, "H" is omitted.

An 8-kbyte area following the first 120-kbyte area, i.e., an area from physical addresses 1E000 to 1FFFF serves as a read-only boot block 17b not to be rewritten. Write access to the boot block 17b is inhibited by a hardware logic arranged in the SI 19 or 29. The entire area of the flash memory constituting the BIOS-ROM 17 is programmable if the flash memory is removed from the system board and a flash memory writer is used. However, in an on-board state, only the main block 17a is rewritable. Write access to the boot block 17b is inhibited by a hardware logic for inhibiting generation of a program signal. Note that the BIOS-ROM 17 can comprise, e.g., an i28F001BX-T available from Intel.

The boot block 17b in the BIOS-ROM 17 is an area in which programs for performing minimum functions for system control are stored. The boot block 17b stores a Far Jump Instruction 17c, a CRC (Cyclic Redundancy Check) routine 17d for performing error detection of data stored in the BIOS-ROM 17, and a routine (address converting and masking routine) 17e for performing address conversion and masking of the BIOS-ROM 17.

This boot block 17b also stores an initialization routine 17f for executing minimum initialization processing, a load routine 11g for transferring a writing routine for rewriting the BIOS-ROM 17 from the floppy disk drive (FDD) 25 to the system memory 13, a key depression detecting routine 17h for detecting the depression/nondepression of a predetermined key for designating rewriting of the main block 17a, and ID (identifier) data 17i used to determine whether a BIOS to be written is compatible with the target computer system model in rewriting the BIOS. This ID data 17i is stored in an area starting from address 1E000. The Far Jump Instruction 17c is stored in an area starting from address 1FFF0 of the BIOS-ROM 17. This area is an area first addressed by the CPU 11 when the system is powered on, thereby executing various programs in the boot block 17b.

On the other hand, a BIOS including an IRT (Initial Reliability Test) and the like, e.g., a BIOS compatible with a conventional personal computer, is stored in the first 64-kbyte area (low memory area) of the main block 17a in the BIOS-ROM 17. A boot routine for loading the IPL of the operating system in the system memory 13 and bootstrapping the operating system is stored in this area. A system management routine is stored in the remaining 56-kbyte area (high memory area) following the first 64-kbyte area of the main block 17a. This system management routine is a program for executing processes such as setup, power-save, suspend, and resume processes.

Two spaces are allocated to the 128-kbyte area of the BIOS-ROM 17 as address spaces accessed by the CPU 11, as shown in FIG. 3. In the 16-Mbyte address space, a High-side 128-kbyte area (addresses FE000 to FFFFF) of the 1-Mbyte between the 15th Mbyte and the 16th Mbyte, and a High-side 128-kbyte area (addresses 0E000 to 0FFFF) of the first 1-Mbyte appear to be present. Access cannot always be performed using addresses corresponding to these areas. Data are present in different spaces depending on whether the system is initialized or in the subsequent normal operating state. This is to cope with the real or protect mode of the CPU 11.

The addresses of the BIOS-ROM 17 in the address space viewed from the CPU 11 are allocated as follows upon power-on of the system. As shown in FIG. 4A, the Low-side (first half) 64-kbyte area is allocated to E000 (segment address): 0000 (intrasegment address) to E000: FFFF, and the High-side (second half) 64-kbyte area is allocated to F000: 0000 to F000: FFFF. On the other hand, in the normal state, as shown in FIG. 4B, the Low-side 64-kbyte area of the BIOS-ROM 17 is allocated to F000: 0000 to F000: FFFF, and the High-side 64-kbyte area is allocated to E000: 0000 to E000: FFFF. That is, when viewed from the CPU 11, the addresses of the Low-side 64-kbyte area and the High-side 64-kbyte area of the BIOS-ROM 17 are reversed between the system initialization and the normal operation, as can be apparent from comparison between FIGS. 4A and 4B. The details of such address conversion will be described with reference to FIG. 5.

A circuit arrangement mainly including an address circuit for addressing the BIOS-ROM 17 is shown in FIG. 5.

The BIOS-ROM 17 receives 17 address bits A0 to A16 corresponding to the 128-kbyte memory capacity, a chip select signal ROMCS# ("#" represents active low), a memory write signal MEMWT#, a memory read signal MEMRD#, and a write signal PROG.

Of 24 address bits A0 to A23 output from the CPU 11, address bits A0 to A15 are directly supplied to the BIOS-ROM 17. Address bit A16 is exclusively ORed with a control signal INV by an EX-OR (exclusive OR) gate so as to perform address conversion corresponding to a system state, as shown in FIGS. 4A and 4B. This EX-OR signal is supplied to the BIOS-ROM 17.

The write signal PROG is set at a high voltage of +12 V in data write access; otherwise, the signal PROG is set at the ground potential. A change in voltage level of this write signal PROG can be performed by a switch 45 in accordance with a control signal ROMPRG. Note that a switching element such as a relay or FET can be used in place of the switch 45.

The chip select signal ROMCS# is generated by a mask circuit 49 for receiving upper eight bits A16 to A23 of 24 address bits A0 to A23 output from the CPU 11, and a control signal DISE#.

This mask circuit 49 will be described with reference to FIG. 6. The mask circuit 49 comprises AND gates 51 and 57, OR gates 53 and 59, and a NAND gate 61. Upper four bits (A20 to A23) of 24 address bits A0 to A23 output from the CPU 11 are supplied to the AND gate 51 to determine whether all the bits A20 to A23 are set at "1" (i.e., the bits A20 to A23 represent "F" in hexadecimal notation). Outputs from the AND gate 51 and the OR gate 53 are supplied to an OR gate 55.

An output from the OR gate 55 and address bits A17 to A19 are supplied to the AND gate 57 to determine whether all address bits A20 to A23 are set at "1" or "0" and all address bits A17 to A19 are set at "1". That is, whether address bits A0 to A23 correspond to any one of FFxxxx, FExxxx, 0Fxxxx, 0Exxxx (xxxx represents any value within the range of 0000 to FFFF) is determined. Address bit A16 and the control signal DISE# are supplied to the OR gate 59.

Outputs from the AND gate 57 and the OR gate 59 are supplied to the NAND gate 61. When both the outputs from the AND gate 57 and the OR gate 59 are set at high level, the NAND gate 61 outputs a chip select signal ROMCS# of active low level. However, when at least one of the outputs from the AND gate 57 and the OR gate 59 is set at low level, a chip select signal ROMCS# of high level which is not active is output from the NAND gate 61.

In the state shown in FIG. 4B, when an address for designating the second half 64-kbyte area of the BIOS-ROM 17 is output from this mask circuit 49 under the control of the CPU 11, access to the BIOS-ROM 17 is enabled/disabled in accordance with the logic level of the signal DISE# because A16 is set at "0" (low level). More specifically, when the signal DISE# is set at low level, the chip select signal ROMCS# is set at high level to inhibit access to the BIOS-ROM 17. Therefore, the address in the range of E000: 0000 to E000: FFFF is masked.

A circuit for generating the control signals INV, DISE#, and ROMPRG will be described with reference to FIG. 7.

Figure 7:
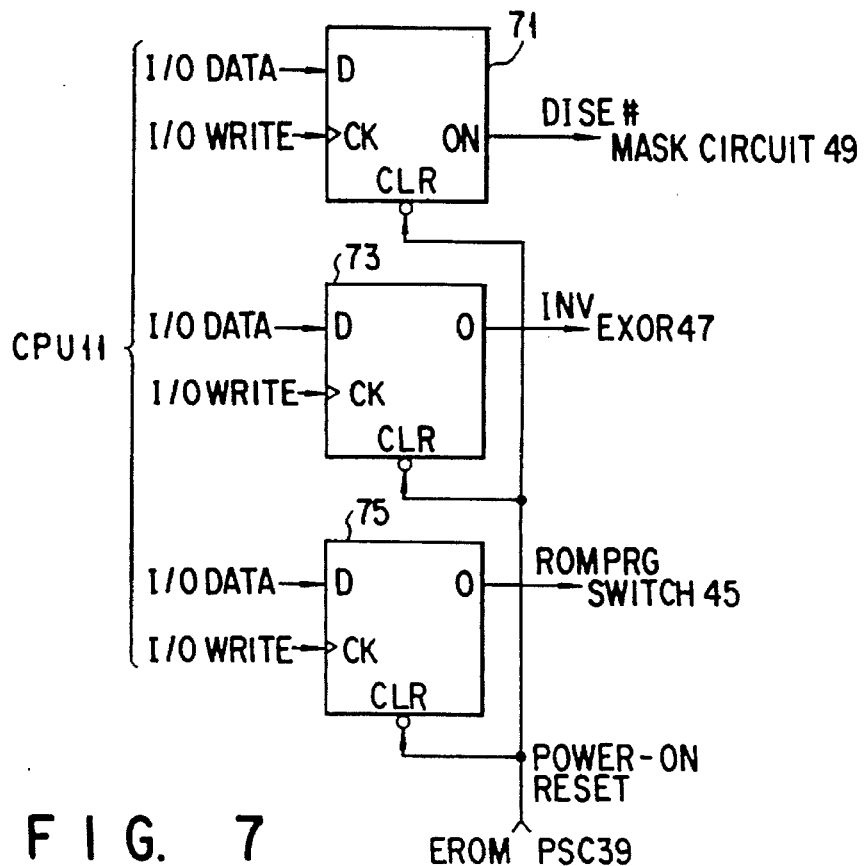
FIG. 7 is a block diagram showing a hardware arrangement for generating a control signal used in hardware shown in FIG. 5.

As shown in FIG. 7, the active low clear terminals (CLRs) of three D flip-flops 71, 73, and 75 commonly receive an active low power-on reset signal supplied from the power supply controller 39 (FIG. 1) when the power switch is turned on. The data input terminals (Ds) of the three flip-flops 71, 73, and 75 receive independent I/O data (each data consists of 1-bit data) from the CPU 11. The clock terminals (CKs) receive I/O write signals from the CPU 11. A negative-phase output QN from the D flip-flop 71 is output to the mask circuit 49 as the signal DISE#. A positive-phase output Q from the D flip-flop 73 is output to an EX-OR 47 as the signal INV. A positive-phase output Q from the D flip-flop 75 is output to the switch 45 as the signal ROM-PRG.

An operation of this embodiment will be generally described with reference to FIG. 8.

When the computer system according to this embodiment is powered on, the computer system operates in accordance with the programs stored in the boot block 17b of the BIOS-ROM 17 (step A1). The boot block is accessed without causing the EX-OR gate 47 to perform address conversion, so that the Far Jump Instruction 17c, the CRC routine 17d, the key depression detecting routine 17h, and the like are executed.

When the CRC is successful (no error is detected), the key depression detecting routine 17h is executed to check whether the predetermined key (the F12 key in this embodiment) for designating rewriting of the main block 17a is depressed.

Figure 8:
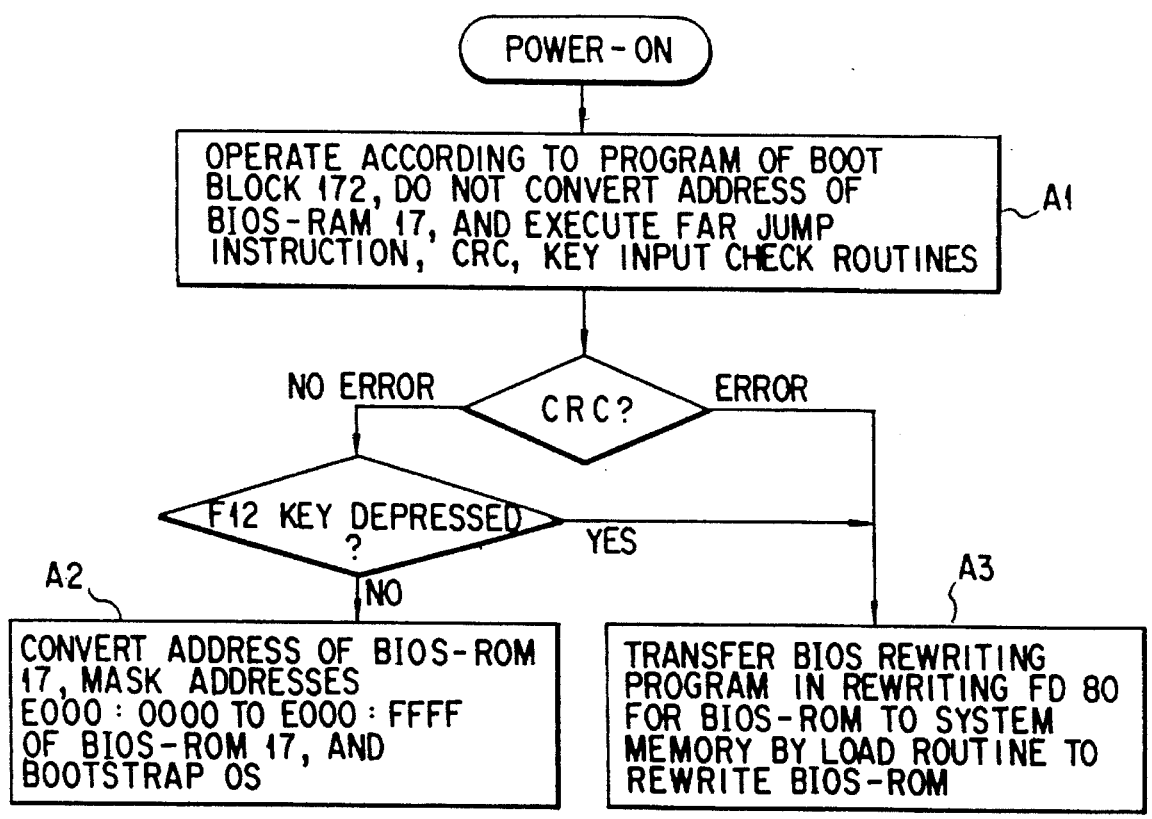
FIG. 8 is a flow chart for generally explaining an operation for bootstrapping the computer system of the first embodiment.

If it is determined that the F12 key is not depressed, processing in step A2 shown in FIG. 8 is executed. In step A2, the addresses of the BIOS-ROM 17 are converted so that the addresses allocated to the BIOS-ROM 17 are set in the state shown in FIG. 4B. The addresses (F000: 0000 to E000: FFFF) of the second half 64-kbyte area of the BIOS-ROM 17 are masked, and control is then shifted to the BIOS stored in the first half 64-kbyte area of the BIOS-ROM 17. In this case, the boot routine is executed to load the IPL of the operating system from, e.g., the HDD 21 to the system memory 13. The main part of the operating system is loaded in the system memory 13 by the IPL, thereby completing bootstrapping of the operating system.

When the CRC is unsuccessful (any CRC error is detected), or the F12 key is depressed although the CRC is successful, this system executes the load routine of the boot block, so that the rewriting program stored in the floppy disk is transferred to the system memory 13.

When this rewriting program is executed, the BIOS stored in the BIOS-ROM 17 is rewritten into the BIOS stored in the floppy disk.

The above operation will be described in detail with reference to FIG. 9.

When the system power switch is turned on, the power supply controller 39 outputs a power-on reset signal of low level. This power-on reset signal is commonly supplied to the clear terminals (CLRs) of the three D flip-flops 71, 73, and 75 shown in FIG. 7, and all the flip-flops 71, 73, and 75 are cleared. In addition, the signal DISE# is set to high level, and the signals INV and ROMPRG are set to low level.

The power-on reset signal from the power supply controller 39 is also supplied to the CPU 11, thereby resetting the CPU 11 (step B1). After the CPU 11 is reset, the CPU 11 outputs an initial address (e.g., FFFFF0) for executing the Far Jump Instruction and a memory read instruction (step B3). The memory read signal MEMRD# from the CPU 11 is then set active low (low level).

Address bit A16 of the address (FFFFF0) output from the CPU 11 is supplied to the EX-OR gate 47 together with the signal INV output from the D flip-flop 73. Address bit A16 is supplied to the BIOS-ROM 17 through the EX-OR gate 47 without any modification because the signal IV is set at low level. Address bit A15 of the address (FFFFF0) output from the CPU 11 is also supplied to the BIOS-ROM 17 without any modification.

When the above operation is performed, the addresses of the BIOS-ROM 17 are detected by the CPU 11, as shown in FIG. 4A. The boot block 17b of the BIOS-ROM 17 is addressed by address bits A0 to A16 (1FFF0) of the address FFFFF0 output from the CPU 11. The Far Jump Instruction 17c stored in the area starting from address 1FFF0 of the boot block 17b and a vector address representing the jump destination in the boot block 17b are read out. The CPU 11 executes the Far Jump Instruction 17c in accordance with the vector address (step B5). After the Far Jump Instruction 17c is executed, the 128-kbyte area of the BIOS-ROM 17 appears to be located in the High-side first 128-kbyte area of the 16-Mbyte memory space (FIG. 3) when viewed from the CPU 11.

The CRC routine 17d for executing the CRC of the storage content of the BIOS-ROM 17 is stored in the jump destination designated by the vector address. Therefore, when the Far Jump Instruction 17c is executed, the CRC of the storage content of the BIOS-ROM 17 is performed, and then the key depression detecting routine 17h is performed in accordance with the CRC result (step B7).

As a result of execution of the CRC routine 17d, when the CRC of the BIOS-ROM 17 is successful (YES in step B9), the CPU 11 passes control to the key depression detecting routine 17h to check whether the F12 key on a keyboard 35 is depressed (step B11).

If it is determined that the F12 key is not depressed (NO in step B11), the CPU 11 sets I/O data of high level in the D flip-flops 71 and 73 in accordance with the routine 17e for converting and masking the address (step B13). By this operation, the signal DISE# is set to low level, and the signal INV is set to high level. In addition, the CPU 11 executes a subroutine stored in the first 16-kbyte area of the BIOS-ROM 17 to bootstrap the operating system (step B15).

When the BIOS is to be accessed under the control of the operating system, the CPU 11 outputs an address in the range of F000: 0000 to F000: FFFF (F0000 to FFFFF) in the same manner as in BIOS access in the conventional personal computer when the BIOS-ROM 17 is accessed without performing the following address conversion, the boot block 17b or the system management routine in the BIOS-ROM 17 is undesirably accessed, as can be apparent from FIG. 4A. However, according to this embodiment, address conversion is performed by the EX-OR gate 47 to accurately access the BIOS in the BIOS-ROM 17.

The operations of constituent elements associated with this address conversion will be described below. When the signal INV is set at high level in accordance with processing in step B13, address bit A16 of address Fxxxx (xxxx falls within the range of 0000 to FFFF) output from the CPU 11 to access the BIOS is level-inverted from level "1" to level "0" by the EX-OR gate 47. This level-inverted A16 is supplied to the BIOS-ROM 17. On the other hand, address bits A0 to A15 of the above address Fxxxx are supplied to the BIOS-ROM 17 without any modification.

As described above, address Fxxxx output from the CPU 11 to access the BIOS is converted into Exxxx which is then supplied to the BIOS-ROM 17. As a result, the first half 64-kbyte area, i.e., the BIOS of the BIOS-ROM 17 is accessed. As described above, the CPU 11 loads the operating system in the system memory 13 to complete initialization of the system.

Upon completion of initialization of the system, assume that the CPU 11 outputs address Exxxx. Address bit A16 as the lest significant bit of the most significant digit (hexadecimal E) of this address Exxxx is set at low level ("0"). In addition, the signal DISE# is also set at low level. For this reason, an output from the OR gate 59 which receives address bit A16 and the signal DISE# is set to low level. Therefore, an output, i.e., the chip select signal ROMCS# from the NAND gate 61 is set to high level to inhibit access to the BIOS-ROM 17.

If it is determined in step B9 that the CRC is unsuccessful (any CRC error is detected) (NO in step B9), or that the F12 key is depressed even if the CRC is successful (YES in step B11), the CPU 11 performs initialization required to rewrite the content of the main block 17a of the BIOS-ROM 17 into correct data in accordance with the initialization routine 17f stored in the boot block 17b of the BIOS-ROM 17 (step B17). That is, the CPU 11 performs initialization of the display controller 29, the system memory 13, the floppy disk controller in the Super Integration IC (SI) 23, and the keyboard controller 33.

The CPU 11 then performs the following processing in accordance with the load routine 17g stored in the boot block 17b in the BIOS-ROM 17.

Figure 10:
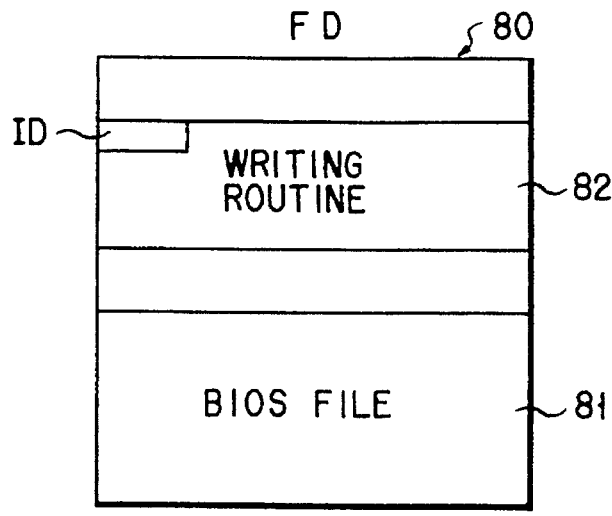
FIG. 10 is a memory map showing the structure of a floppy disk for storing a BIOS file to be transferred to the BIOS-ROM of the first embodiment.

First of all, the CPU 11 controls the display controller 29 to cause the display panel 31 to display a prompt for inserting a floppy disk (FD) 80 having a data structure shown in FIG. 10 into the floppy disk drive (internal FDD) 25 (step B19). The screen having this prompt also displays a prompt for operating a next key on the keyboard (KBC) 35 upon insertion of the floppy disk.

The user inserts the floppy disk 80 which stores predetermined information into the floppy disk drive 25 and operates keys on the keyboard in accordance with the prompts on the screen. This key operation is detected by the CPU 11 (step B21).

The BIOS-ROM rewriting floppy disk 80 will be described with reference to FIG. 10. This floppy disk 80 is a BIOS-ROM rewriting floppy disk which stores information for rewriting the main block 17a of the BIOS-ROM 17. This floppy disk 80 stores a BIOS file 81 and a writing routine 82 for rewriting (repairing) the storage content of the BIOS-ROM 17 using the BIOS file 81. The BIOS file 81 stores the BIOS and the system management routine. Identification data ID for identifying a model which can use the BIOS file 81 is stored in a predetermined area of the writing routine 81. This is because various BIOSs corresponding to various computer models are available like various computer models are available. If a correct BIOS corresponding to the model of the user is not used, the BIOS does not operate correctly.

When the CPU 11 detects in step B21 that a key on the keyboard 35 is depressed (YES in step B21), the CPU 11 determines whether a specific file is stored in the floppy disk inserted into the floppy disk drive 25 (step B23). That is, the CPU 11 confirms that a plurality of files required for rewriting processing are stored on the basis of predetermined file names. If the predetermined files are not stored in the floppy disk (NO in step B23), the CPU 11 determines that the floppy disk inserted into the floppy disk drive 25 is not the BIOS-ROM rewriting floppy disk 80. The flow then returns to processing in step B19 again to display a prompt for inserting a correct floppy disk on the display panel 31.

When the CPU 11 determines that the predetermined files are stored in the inserted floppy disk (YES in step B23), the CPU 11 determines that the BIOS-ROM rewriting floppy disk 80 is inserted into the floppy disk drive 25. The CPU 11 then transfers the writing routine 82 stored in the floppy disk 80 to the system memory 13 in accordance with the load routine 17g (step B25).

Subsequent control by the CPU 11 is performed on the basis of the writing routine 82. The CPU 11 reads ID data from the inserted floppy disk 80 and compares it with the ID data 17i stored in the boot block 17b (step B27). If the ID data stored in the floppy disk 80 coincides with the ID data 17i stored in the boot block 17b (YES in step B27), the CPU 11 determines that the BIOS file 81 stored in the floppy disk 80 can be used in the computer system of the user.

The CPU 11 sets I/O data of high level in the D flip-flop 75 shown in FIG. 7 (step B14). The signal ROMPRG is set to high level, and the switch 45 is switched to the +12 V side. This voltage of +12 V is applied to a terminal PROG of the BIOS-ROM 17 constituted by the flash memory, so that the BIOS-ROM 17 is set in a data write enable state.

At this time, the D flip-flops 71 and 73 are set in a state (clear state) as in the power reset state. For this reason, the signal DISE# is set at high level, and the signal INV is set at low level. When the signal INV is set at low level, address bit A16 from the CPU 11 is directly supplied to the BIOS-ROM 17. In this case, if an output from the AND gate 57 in the mask circuit 49 is set at high level, the signal ROMCS# is set to low level regardless of the value of address bit A16 because the signal DISE# is set at high level. Therefore, the BIOS-ROM 176 can be accessed.

There are two conditions for setting the output from the AND gate 57 to low level. The first condition is that address bits A17 to A23 are all "1"s, i.e., address bits A0 to A23 represent FFxxxx (A16="1") or FExxxx (A16="0"). The addresses satisfying the first condition range from FE0000 to FFFFFF representing the last (High side) 128-kbyte area of the last 1-Mbyte area of the 16-Mbyte memory space shown in FIG. 3.

The second condition is that address bits A17 to A19 are set at all "1"s and address bits A20 to A23 are set to all "0"s, i.e., address bits A0 to A23 represent 0Fxxxx (A16="1") or 0Exxxx (A16="0"). The addresses satisfying the second condition range from 0E0000 to 0FFFFF representing the last (High side) 128-kbyte area of the first 1-Mbyte area of the 16-Mbyte memory space shown in FIG. 3.

In this embodiment, when the voltage of +12 V is applied to the BIOS-ROM 17 in step B29, and addresses A17 to A23 output from the CPU 11 satisfy the first and second conditions, the signal ROMCS# goes to low level regardless of the value of address bit A16. That is, the entire area of the main block 17a of the BIOS-ROM 17 is write-accessible.

When data write access to the BIOS-ROM 17 is enabled, the CPU 11 transfers the content of the BIOS file 81 in the floppy disk 80 inserted into the floppy disk drive 25 to the BIOS-ROM 17 (step B31). In this case, the CPU 11 uses an address satisfying the above conditions to write the content of the BIOS file 81 in the main block 17a of the BIOS-ROM 17. The content of the main block 17a of the BIOS-ROM 17 is rewritten into the content of the BIOS file 81 stored in the BIOS-ROM rewriting floppy disk 80.

When rewriting of the content of the BIOS-ROM 17 is completed, the CPU 11 causes the display panel 31 to display a prompt for temporarily powering off the system and then powering on the system again (step B33). When the system is powered on again, the series of operations described above are performed.

When it is determined in step B27 that the ID data stored in the floppy disk 80 does not coincide with the ID data 17i stored in the boot block 17a (NO in step B27), this determination indicates that some failure may occur if the BIOS file 81 stored in the floppy disk 80 is used in the computer system in which the floppy disk 80 is inserted. For this reason, the CPU 11 displays an alarm message on the display panel 31 to prompt to insert a floppy disk which stores the correct BIOS file and then power the system on again. This alarm message may be in the form of a voice message using a voice board in the computer system or in the form of a beep-ON function.

As described above in detail, in this embodiment, the flash memory used as the BIOS-ROM 17 has the main block 17a as a rewriting target and the read-only boot block 17b which does not serve as a rewriting target. The key depression detecting routine stored in the boot block 17b is executed upon power-On prior to the bootstrapping of the operating system. Upon execution of this key depression detecting routine, if no key depression (input) is detected, the boot routine of the main block 17a is executed to bootstrap the operating system. However, when depression of the F12 key is detected, the load routine stored in the boot block 17b is executed. Upon execution of this load routine, the writing routine is forcibly loaded from the floppy disk 80 to the main memory 13 and executed. As a result, the content of the main block 17a is rewritten.

In this manner, the F12 key is depressed to forcibly execute the writing program (routine). For example, even if the content of the rewritable main block 17a is destroyed to disable bootstrapping of the system, the content of the main block 17a can be repaired in the on-board state.

In this embodiment, boot processing or BIOS rewriting processing is selectively performed by using a CRC check and an F12 depression (input) check due to the following reason. Even if the BIOS content is destroyed and the system cannot be normally initialized, the CRC check may sometimes determine that no error has occurred. By checking the key input on the keyboard serving as a typical example of an input means for a computer or workstation, the CRC check result need not be used to select boot processing or BIOS rewriting processing.

In practice, when an error is found in the CRC check, the system cannot be initialized. For this reason, the BIOS is rewritten to repair a memory portion having been subjected to the CRC check error. In this embodiment, regardless of whether the CRC check determines that an error has or has not occurred, the CRC check and the F12 input check are preferably used to load the BIOS writing routine upon depression of the F12 key.

The user need not prepare a BIOS rewriting device nor input a predetermined command. The user need only depress a predetermined key.

(Second Embodiment)

The second embodiment of the present invention will be described with reference to the accompanying drawings.

Figure 11:
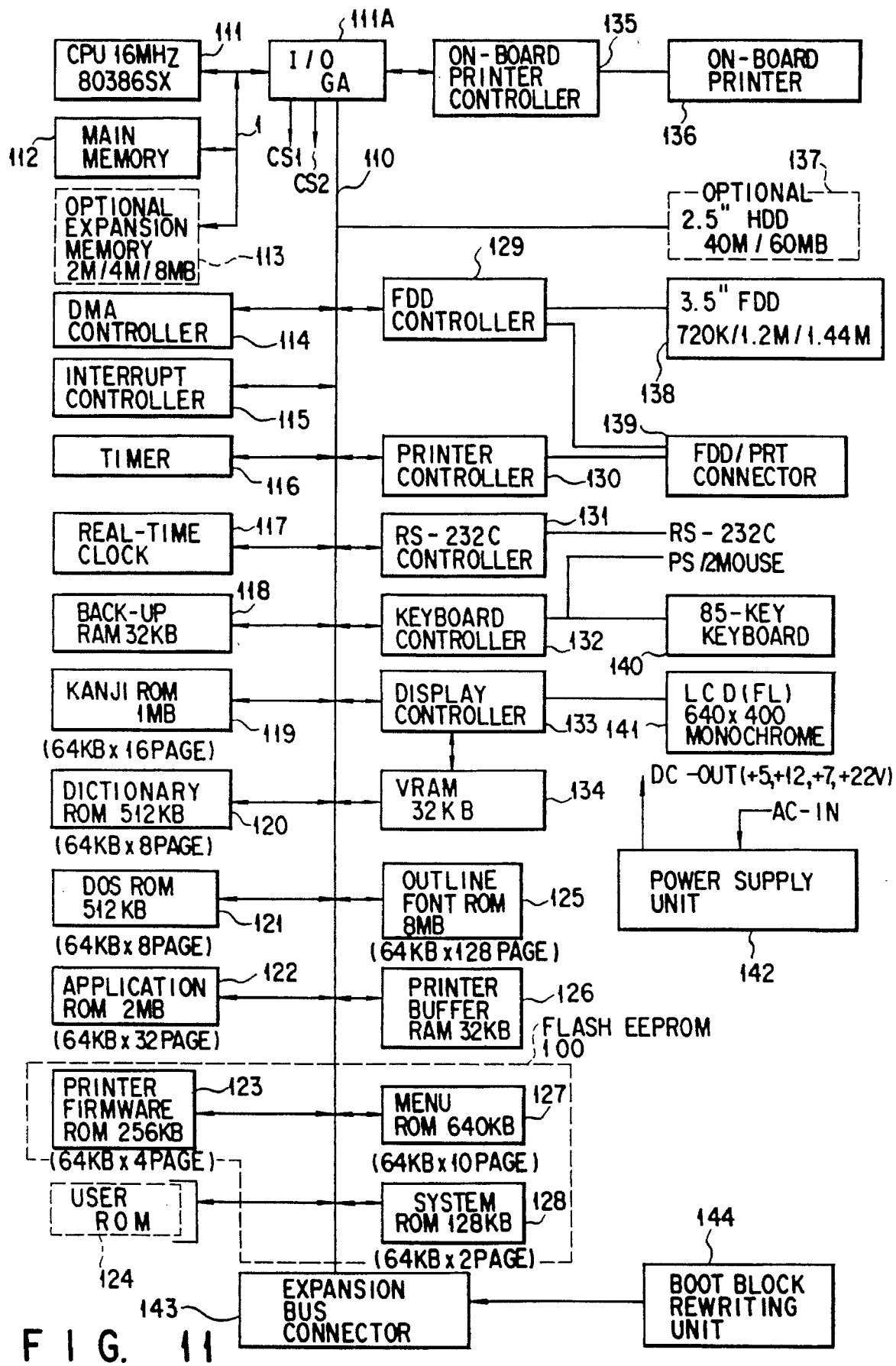
FIG. 11 is a block diagram showing the arrangement of a computer system according to the second embodiment of the present invention.

FIG. 11 shows the arrangement of a portable computer system according to the second embodiment of the present invention. This portable computer is a laptop or notebook computer and comprises a memory bus 1, a system bus 110, a CPU 111, and an I/O gate array 111A. A main memory 112 is connected to the memory bus 1. An expansion memory 113 can be optionally connected to the memory bus 1.

The CPU 111 is used to control the overall system. The CPU 111 has a function of displaying various operation menus on the screen, and a function of executing various processing operations designated by the user on the menu screen.

The I/O gate array 111A controls to access various memories and various I/Os and also controls a bus cycle. The main memory 112 stores programs and data as processing targets. This main memory 112 has a memory capacity of, e.g., 2 Mbytes. The 640-kbyte area of the first 1-Mbyte area is used as a system memory, and the remaining 384-kbyte area is used as a work area. Part of the area except for the above system memory in the 2-Mbyte area of the main memory 112 can be set as a hard RAM or an EMS memory. The expansion memory 113 is a 2-/4-/8-Mbyte memory card. The expansion memory 113 can be mounted to expand the memory. The above hard RAM and EMS memory can be set in the memory area expanded by the expansion memory 113. Note that the EMS memory is an LIM-EMS (Lotus-Intel-Microsoft Expanded Memory Specification which is developed by Lotus, Intel, and Microsoft) RAM area.

A DMA controller (Direct Memory Access controller) 114, an interrupt controller 115, a timer 116, a real-time clock 117, and a backup RAM 118 are connected to the system bus 110. The real-time clock 117 is a time-piece module having its own operating battery and has a static CMOS RAM always backed up with this battery. This static RAM is used to store setup information representing a system configuration. The backup RAM 118 is a memory backed up with a battery and has a memory capacity of 32 kbytes. Display data of a pep-up window for setting up the system is saved in this backup RAM 118, and when a resume function is executed, data stored in controllers is saved in the same.

The system bus 110 is also connected to a kanji ROM 119, a dictionary ROM 120, a DOSROM 121, an application ROM 122, a printer firmware ROM 123, a user ROM 124, an outline font ROM 125, a printer buffer RAM 126, and a menu ROM 127.

The kanji ROM 119 has a memory capacity of 1 Mbyte (64 kbytes×16 pages) and stores various kanji fonts. The dictionary ROM 120 has a memory capacity of 12 kbytes (64 kbytes×8 pages) and stores a kana-kanji conversion dictionary. The DOSROM 121 has a memory capacity of 512 kbytes (64 kbytes×8 pages) and prestores an operating system such as a DOS (Disk Operating System). The DOSROM 121 also stores a menu display program as an autoexec.bat file executed upon starting the operating system.

The application ROM 122 has a memory capacity of 512 kbytes (64 kbytes×32 pages) and has a memory area which stores a spreadsheet program and a memory area which stores a wordprocessor program.

The printer firmware ROM 123 has a memory capacity of 256 kbytes (64 kbytes×4 pages) and stores firmware for controlling an on-board printer 136 and firmware for developing character fonts such as outline fonts. The user ROM 124 is connected to the system bus 110 through an IC socket and is mounted by the user as needed. This user ROM 124 is constituted by, e.g., an OTPROM.

The outline font ROM 125 has a memory capacity of 8 Mbytes (64 kbytes×128 pages) and stores outline fonts having various type faces. The font source of the outline fonts is prepared for plural types of fonts per character so as to select an appropriate font in accordance with each character size used. The printer buffer RAM 126 is realized using a 32-kbyte area of the 2-Mbyte SRAM, and printing data is developed therein.

The menu ROM 127 has a memory capacity of 640 kbytes (64 kbytes×10 pages) and stores icons displayed on the menu screen and programs for managing personal information such as schedules and addresses.

The kanji ROM 119, the dictionary ROM 120, the DOSROM 121, the application ROM 122, the printer firmware ROM 123, the user ROM 124, the outline font ROM 125, the printer buffer RAM 126, and the menu ROM 127 are arranged to be selectively accessed through a ROM access EMS window mapped to a predetermined system address.

The system bus 110 is further connected to a system ROM 128, an FDD controller 129, a printer controller 130, an RS-232C controller 131, a keyboard controller 132, and a display controller 133.

The system ROM 128 has a memory capacity of, e.g., 128 kbytes and has a main block for storing various basic input/output programs (BIOSs; Basic I/O systems) and a boot block for storing programs for performing a BIOS content check. In practice, this system ROM 128 is realized by a 1-Mbyte flash EEPROM 100 together with the printer firmware ROM 123, the menu ROM 127, and the system ROM 128 described above. The details of this flash EEPROM 100 will be described in detail later with reference to FIG. 12.

The FDD controller 129 controls a floppy disk drive (FDD) 138 for driving a 3.5" floppy disk. The floppy disk drive (FDD) 138 is a 3-mode drive for supporting three recording forms, i.e., 720-kbyte, 12-Mbyte, and 1.44-Mbyte modes. The FDD controller 129 also controls a 5" floppy disk drive optionally connected through an FDD/printer connector 139. The printer controller 130 controls an external printer optionally connected through the FDD/printer connector 139. The RS-232C controller 131 controls RS-232C devices. The keyboard controller 132 controls an 85-key on-board keyboard 140 and a mouse. The display controller 133 controls read/write access to an image memory (VRAM) 134 and display of a monochrome display 141 having a resolution of 640×400 dots.

This portable computer also comprises an on-board printer controller 135 and an on-board printer 136. The on-board printer controller 135 controls the on-board printer 136 and is connected to the I/O gate array 111A. The on-board printer 136 is a 56-dot serial thermal printer built into the portable computer main body and can be connected to an automatic postcard feeder.

This portable computer further comprises a power supply controller 142 for applying an operating voltage or a backup voltage to each unit. A 2.5" on-board hard disk pack 137 can be optionally mounted in the portable computer. A hard disk drive (HDD) and a hard disk drive controller (HDC) are arranged in this hard disk pack 137.

An expansion bus connector 143 is connected to the system bus 110. This expansion bus connector 143 is used to connect an expansion unit to the system bus 110. For example, a boot block rewriting unit 144 for rewriting the boot block can be connected to the expansion bus connector 143. The boot block rewriting unit 144 has a ROM addressed by a system address belonging to the same address range as that of the boot block of the system ROM 128. The ROM of the boot block rewriting unit 144 stores a program for rewriting the boot block of the flash EEPROM 100.

Figure 12:
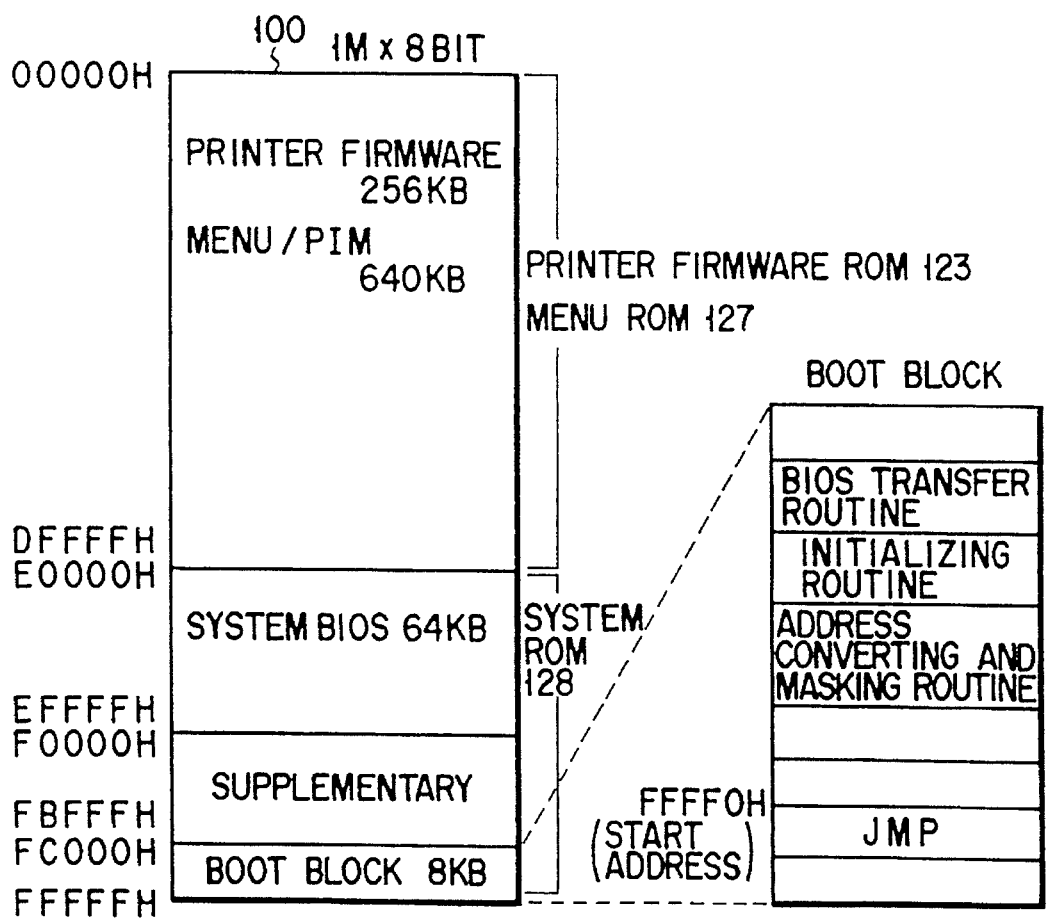
FIG. 12 is a view showing storage the contents of a flash EEPROM arranged in the system of the second embodiment.

The arrangement of the flash EEPROM will be described with reference to FIG. 12.

The flash EEPROM 100 has a memory capacity of 1 Mbyte (1 Mbyte×8 bits) and is addressed by address bits A19 to A0 having the 20-bit width of the 24-bit system address (A23–A0). The 1-Mbyte address space from physical addresses 00000H to FFFFFH is allocated to the flash EEPROM 100. In this flash EEPROM 100, the 896-kbyte area from physical addresses 00000H to DFFFFH is an area used for the printer firmware ROM 123 and the menu ROM 127 describe above. Printer firmware, menu information, and personal management information are stored in this area. The 128-kbyte area from physical addresses E0000H to FFFFFH is an area used for the system ROM 128. The 64-kbyte area from physical addresses E0000H to EFFFFH in the above 128-kbyte area is used as the system BIOS area for storing a system BIOS. The 8-kbyte area from physical address FC00H to FFFFFH in the remaining 64-kbyte area is used as a boot block area in which the boot block is stored.

The boot block is a program for executing a minimum function for controlling the system. As shown in FIG. 12, the boot block comprises a Far Jump Instruction (JMP), a CRC (Cyclic Redundancy Check) routine for checking the system BIOS content, an address converting routine for the flash EEPROM, and a BIOS transfer routine. The BIOS transfer routine is a program for transferring a writing routine used for rewriting the system BIOS from the floppy disk (FDD) 128 to the main memory 112. The Far Jump Instruction is stored in the storage position (start address FFFF0H in this case) which is addressed first by the CPU 111 upon resetting the CPU 111. This Far Jump Instruction is thus executed first. The jump destination of the Far Jump Instruction represents the CRC routine. The address converting routine is to reverse the addresses between the boot block area and the system BIOS area. This address conversion will be described in detail with reference to FIG. 14.

A memory map managed by the CPU 111 in the portable computer shown in FIG. 11 will be described with reference to FIG. 13.

Figure 13:
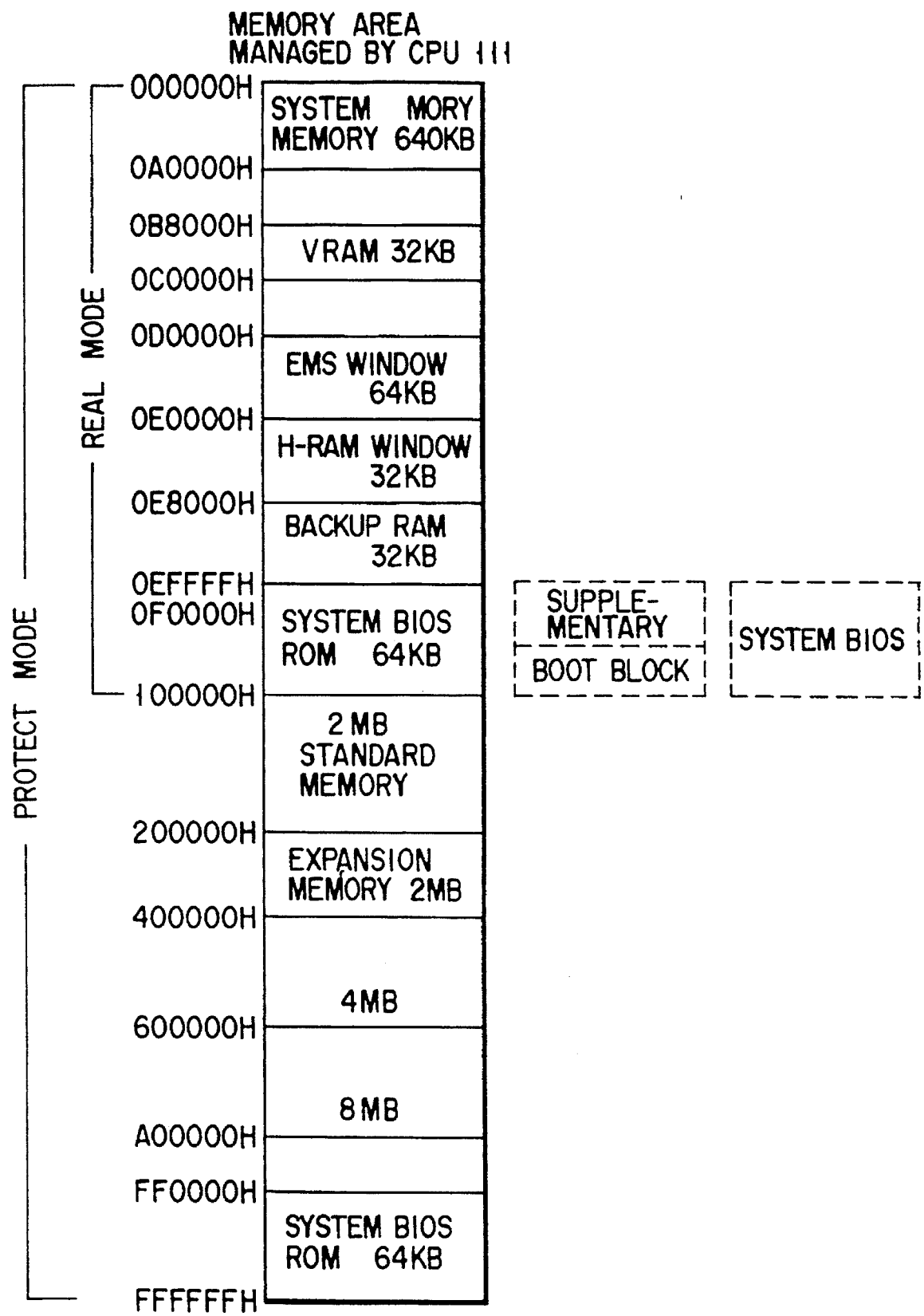
FIG. 13 is a view showing a memory map in the system of the second embodiment.

As shown in FIG. 13, the system ROM 128 is mapped to the 64-byte system address space from system addresses F000H to FFFFFH. The CPU 111 accesses the system ROM area of the flash EEPROM 100 through this 64-kbyte space from address F000H to address FFFFFH.

Since the system ROM area of the flash EEPROM 100 has the 128-kbyte area, as described above, the system BIOS area and the boot block area are selectively mapped to the 64-kbyte space from system address F000H to system address FFFFFH.

In system initialization, prior to execution of the system BIOS, the boot block area is mapped to the space from system address F000H to system address FFFFFH to check the system BIOS content. On the other hand, when the BIOS check is completed, the system BIOS area is normally mapped to the 64-kbyte area from system address F000H to system address FFFFFH.

Address allocation to the flash EEPROM 110 will be described in detail with reference to FIG. 14.

Figure 14:
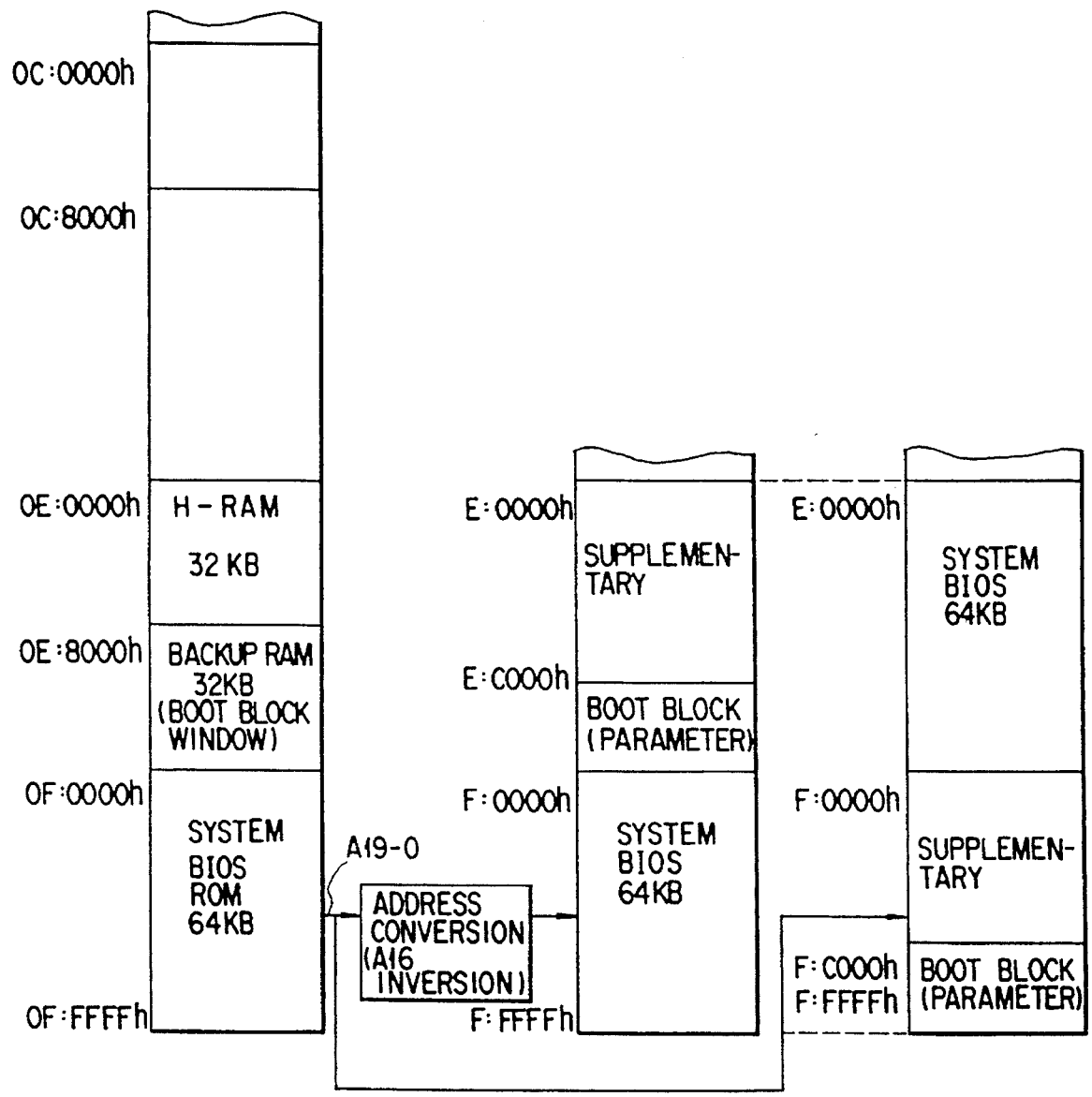
FIG. 14 is a view showing address allocation to the flash EEPROM in the system of the second embodiment.

As shown in FIG. 14, in system initialization, system address bits A19 to A0 having the 20-bit width of system address bits A23 to A0 having the 24-bit width from the CPU 111 so as to address the flash EEPROM 100 are directly supplied to the flash EEPROM 100 as the physical addresses. As a result, the boot block area and a supplementary area of the flash EEPROM 100 are mapped to the 64-kbyte area from system address F000H to system address FFFFFH. In this case, the system BIOS area is mapped to the 64-kbyte space from system address E000H to system address EFFFFH. This area is used for access to a backup RAM or the like, and access to the system BIOS area is disabled.

Upon completion of the boot block (normal operation), the logic level of bit 16 (A16) of address bits A19 to A0 having the 20-bit width for addressing the flash EEPROM 100 is inverted, and system address bits A19 to A0 having the 20-bit width and including the inverted A16 are supplied to the flash EEPROM 100 as the physical address. Inversion of this address bit A16 is performed by the address converting routine in the boot block.

Address A16="0" designates segment address E, address A16="1" designates segment address F. When address bit A16 is inverted, the addresses are reversed between the system BIOS area and the boot block area. After inverting address bit A16, the CPU 111 refers to the system BIOS area of the flash EERPOM 100 through the space from system address F000H to system address FFFFFH.

In this case, the boot block area is mapped to the 8-kbyte space from system address EC00H to system address EFFFFH. Since this area is used to access the backup RAM or the like, access to the boot block through this address space is disabled. However, in rewriting the boot block, the boot block window can be opened to the 8-kbyte space from system address EC00H to system address EFFFFH.

In this way, the system BIOS area and the boot block area of the flash EEPROM 100 are switched by inverting address bit A16. In system initialization, the boot block is mapped to the space from address F000H to address FFFFFH for system ROM access. After the system BIOS check is completed, the system BIOS is mapped to this space.

FIG. 15 shows the hardware arrangement near the flash EEPROM 100 and the arrangement of the boot block rewriting unit 144.

As described above, an advantage derived from use of the flash EEPROM 100 lies in that repair and upgrading of a program such as a system BIOS can be performed after shipment without disassembling the system, i.e., can be performed in the on-board state. However, the boot block of the flash EEPROM 100 is a program which is executed first in initializing the system. If this boot block area content is destroyed, the check of the system BIOS content cannot be performed, and the system cannot be started.

In the arrangement shown in FIG. 15, access to the flash EEPROM 100 is temporarily inhibited using a master signal (MAST) on the system bus 110 to pass control to an external ROM 201, thereby rewriting the boot block.

A detailed circuit arrangement will be described in detail below.

A chip select signal CS1 is supplied from the I/O gate array 111A to the flash EEPROM 100 through a chip select signal line 401. This chip select signal CS1 is generated when the system address value belongs to the range of addresses F000H to FFFFFH. A program power supply voltage (PROG) of, e.g., +12 V is applied to the program power supply terminal (VPP) of the flash EEPROM 100 through a program power supply line 402. This program power supply voltage (PROG) is generated during the operation of the program for rewriting the content of the flash EEPROM 100.

The output enable terminal (OE) and the write enable terminal (WE) of the flash EEPROM 100 are connected to a memory read (MEMR) signal line 101a and a memory write signal (MEMW) line 101b, respectively, of the system bus 110. The A16 terminal of the address input terminals having the 20-bit width of the flash EEPROM 100 is connected to the address bit A16 output terminal (RM16) of the I/O gate array 111A through a signal line 403, and the remaining 19 bit lines are connected to the lower 20 bits (A19 to A17 and A15 to A0) of an address bus (A23 to A0) 102 except for system address bit A16. The data input/output terminals of the flash EEPROM 100 are connected to the lower eight bits (SD7 to SD0) of a data bus (SD15 to SD0) 103. The address bit A16 output terminal (RM16) of the I/O gate array 111A outputs A16 of the system address onto the signal line 403 without modification in system initialization. Upon execution of the boot block program or in rewriting the boot block, address bit A16 is inverted, and the inverted bit is output onto the signal line 403.

The boot block rewriting unit 144 is constituted by a master signal (MAST) generator 202 and a CS controller 203. As described above, this boot block rewriting unit 144 is connected to the system bus 110 through the expansion bus connector 143. When the boot block rewriting unit 144 is connected to the expansion bus connector 143, as shown in FIG. 15, the output enable terminal (OE) of the ROM 201 is connected to the memory read signal (MEMR) line 101a of the system bus 110, and the address input terminals are connected to the lower 16 bits (A15 to A0) of the address bus (A23 to A0) 102 and the lower eight bits (SD7 to SD0) of the data bus (SD15 to SD0) 103.

This ROM 201 has a memory capacity of 64 kbytes (64 kbytes×8 bits), as shown in FIG. 16, and is addressed by address bits A15 to A0 having a 16-bit width. That is, the 64-kbyte space from physical address 000H to physical address FFFFH is allocated to the ROM 201. By this physical address allocation, the ROM 201 is mapped to the 64-kbyte space from system address F000H to system address FFFFFH.

The ROM 201 stores a Far Jump Instruction, an address converting routine, a boot block window open routine, a boot block transfer routine, and a new boot block.

The address converting routine inverts the logic level of system address bit A16 so as not to cause the boot block area of the flash EEPROM 100 to coincide with the addresses of the ROM 201. By this logic inversion of bit A16, the boot block area of the flash EEPROM is allocated to address EC00H.

The boot block window open routine is a routine for opening the boot block window for accessing the boot block area of the flash EEPROM 100. This boot block window is allocated to the range of system addresses EC00H to EFFFFH. That is, in a normal operation, when the system address value belongs to the range of addresses F000H to FFFFFH, the chip enable signal CS1 for the flash EEPROM 100 is generated. However, when the boot block window is opened, the chip enable signal CS1 for the flash EEPROM 100 is generated even if the system address value belongs to the range of addresses EC00H to EFFFFH corresponding to this window. Therefore, the boot block of the flash EEPROM 100 can be accessed through the boot block window.

The boot block transfer routine is a program for writing the content of a new boot block stored in the ROM 201 to the boot block area of the flash EEPROM 100. Upon execution of this program, the boot block of the flash EEPROM is rewritten. The new boot block stored in the ROM 201 also includes a Far Jump Instruction, a CRC routine, an address converting routing, a BIOS transfer routine, and the like as in the boot block of the flash EEPROM 100.

The Far Jump Instruction is stored at a storage position (start address FFF0H in this case) which is addressed first by the CPU 111 upon resetting the CPU 111. This Far Jump Instruction is thus executed first. The jump destination of this Far Jump Instruction represents the address converting routine of the ROM 201.

Referring to FIG. 15, the master signal generator 202 is connected to a reset (RESET) signal line 104, a master (MAST) signal line 105, and a clock (CLK) signal line 106 of the system bus 110. The master signal generator 202 generates a master (MST) signal for a predetermined period of time in response to a reset (RESET) signal from the I/O gate array 111A. This master (MAST) signal is used to inform the I/O gate array 111A of mounting of the boot block rewriting unit 144. The generation period of the master (MAST) signal is based on the clock (CLK) signal supplied through the clock (CLK) signal line 106. In this embodiment, the master (MAST) signal is generated until two clocks elapse after the trailing edge of the power-on reset (PCLR) signal.

The CS controller 203 enables the chip enable signal for the ROM 201 in response to the reset (RESET) signal.

The arrangement of the master signal generator 202 and the timings of the respective signals will be described with reference to FIGS. 19 and 20A to 20C. The master signal generator 202 comprises two D flip-flops 202A and 202B. The reset (RESET) signal is supplied to the data input terminal (D) of the flip-flop 202A, and an output from its output terminal (Q) is supplied to the data input terminal (D) of the flip-flop 202B. An output from the output terminal (Q) of the flip-flop 202B is supplied as the master (MAST) signal to the I/O gate array 111A through the expansion bus connector 143. The system clock (CLK) signal is commonly supplied from the system main body to the clock terminals (CK) of the flip-flops 202A and 202B.

With the above arrangement, the master signal generator 202 generates the master (MAST) signal in response to the reset (RESET) signal at timings shown in FIGS. 20B and 20C.

A hardware arrangement for controlling the flash EEPROM in the I/O gate array 111A will be described with reference to FIG. 17.

As shown in FIG. 17, the I/O gate array 111A includes a flash memory control register 501, a system ROM enable register 502, an A16 inverter 503, first and second address range determination circuits 504 and 505, a program power supply voltage output circuit 506, a master signal detector 507, and a reset signal generator 508.

The CPU 111 sets a program control flag (PRG) to bit 5 of the flash memory control register 501, an address inversion control flag (INV) to bit 5 thereof, and a boot block window enable control flag (BBEN) to bit 0 thereof.

The program control flag (PRG) is a flag for generating a program power supply voltage PROG to be applied to the flash EEPROM 100. In a program mode, the program control flag is set at "1". The address inversion control flag (INV) is a flag for designating inversion/noninversion of address bit A16. In an address inversion mode, the address inversion control flag (INV) is set at "1". The boot block window enable control flag (BBEN) is a flag for designating to open the window for accessing the boot block of the flash EEPROM 100. In a boot block window open mode, the boot block window enable control flag (BBEN) is set to "1".

These flag values from the flash memory control register 501 are reset to an initial value of "0" in response to the power-on reset (PCLR) signal from the power supply unit 142.

The system ROM enable register 502 is used to restore an access enable state of the flash EEPROM 100 upon rewriting the boot block. A system BIOS enable flag (EN-BIS) is set to bit 7 of the register 502 by the CPU 111. When the system BIOS enable flag (EN-BIS) of "1" is set, a function of disabling access to the flash EEPROM 100 through addresses F000H to FFFFFH supplied from the master signal detector 507 is reset.

The value of the system BIOS enable flag (EN-BIS) is reset to an initial value of "0" in response to the power-on reset signal from the power supply unit 142.

The A16 inverter 503 performs logic inversion of address bit A16 of system address bits A23 to A0 from the CPU 111. When the address inversion control flag (INV) is set at "1", address bit A16 is inverted, and the inverted bit is output onto the signal line 403. However, when the address inversion control flag (INV) is set at "0", address bit A16 is directly output onto the signal line 403.

The first address range determination circuit 504 determines whether the value of the system address from the CPU 11 belongs to the range of F000H to FFFFFH for accessing the system ROM. If so, the circuit 504 generates the chip select signal CS1 through an OR gate G1. This address range determination circuit 504 is normally set in an enable state, but is disabled in response to a detection output from the master signal detector 507.

The second address range determination circuit 505 determines whether the value of the system address from the CPU 11 belongs to the address range of EC00H to EFFFFH corresponding to the boot block window. If so, the circuit 505 generates the chip select signal CS1 through the OR gate G1. The operation of this address range determination circuit 505 is enabled only when the boot block window enable control flag (BBEN) is set at "1"; otherwise, the circuit 505 is kept disabled.

The program power supply voltage output circuit 506 selects one of the power supply voltage VPP of 12 V and GND and outputs the selected voltage as the program power supply voltage PROG. When the program control flag (PRG) is set at "1", the circuit 506 selects the power supply voltage VPP of 12 V.

The master signal detector 507 is arranged to detect whether the boot block rewriting unit 144 is mounted. The master signal detector 507 latches the master signal (MAST) at the trailing edge of the power-on reset signal from the power supply unit 142. If a significant master signal (MAST) is generated, the master signal detector 507 detects that the boot block rewriting unit 144 is mounted, thereby disabling the first address range determination circuit 504.

The reset signal generator 508 outputs a system reset signal in response to the power-on reset signal from the power supply unit 142. Note that the power-on reset signal is inverted, and the resulting signal is output as the reset signal in this embodiment.

An operation of rewriting the boot block of the flash EEPROM 100 will be described with reference to FIGS. 15 to 20C.

When the boot block of the flash EEPROM 100 is destroyed or is to be upgraded, the boot block rewriting unit 144 is connected to the expansion bus connector 143.

When the power switch is turned on in this state, a power-on reset signal is generated by the power supply unit 142. In response to this power-on reset signal, the reset generator 508 in the I/O gate array 111A generates a system reset signal (RESET) (step C1 in FIG. 18). This reset signal is supplied to the master signal generator 202 and the CS controller 203 in the boot block rewriting unit 144 through the reset signal line 104 and the expansion bus connector 143. Note that the system reset signal is a signal obtained by inverting the power-on reset signal (PCLR) which is kept significant for about one second, as shown in the timing charts of FIGS. 20A and 20B.

The master signal generator 202 outputs a master signal (MAST), as shown in the timing chart of FIG. 20C (step C3). The master signal generator 202 is constituted by the two D flip-flops 202A and 202B, as described above. The master signal generator 202 generates, as the master (MAST) signal, a system reset signal delayed by two periods of the clock (CLK).

The master signal is supplied to the master signal detector 507 in the I/O gate array 111A through the expansion bus connector 143 and the master signal line 105. The master signal detector 507 detects the master signal (MAST) at the trailing edge of the power-on reset signal. If the detected master signal is significant, the master signal detector 507 detects that the boot block rewriting unit 144 is mounted, thereby disabling the first address range determination circuit 504. In the subsequent operation, even if a system address belonging to the range of addresses F000H to FFFFFH is generated, the chip select signal (CS1) to the flash EEPROM 100 is not generated.

The system address (start address FFFFF0) for accessing the boot block of the flash EEPROM 100 is kept output onto the address bus 102 of the system bus 110 and is supplied to the ROM 201 in the boot block rewriting unit 144.

The CS controller enables the chip select signal CS for the ROM 201 in response to the system reset signal.

The ROM 201 is then read-accessed by the system address for accessing the boot block of the flash EEPROM 100. Since the Far Jump Instruction is stored at physical address FFFF0, this Far Jump Instruction is addressed and fetched by the CPU 111 and is executed (step C5). In the subsequent operation, control is passed to the program of the ROM 201.

When control is passed to the program of the ROM 201, the address converting routine in the ROM 201 is executed to set the address inversion control flag (INV) of "1" in the flash memory control register 501, thereby enabling the A16 inverter 503. The A16 inverter 503 performs logic inversion of address bit A16 (step C7). By this logic inversion of address bit A16, the boot block area of the flash EEPROM 100 is remapped to the range of system address EC000H to system address EFFFFH.

The boot block window open routine of the ROM 201 is executed, and the boot block window enable control flag (BBEN) of "1" is set in the flash memory control register 501, thereby enabling the second address range determination circuit 505 and hence opening the boot block window (step C9).

In the subsequent operation, when the value of the system address belongs to the range of addresses EC000H to EFFFFH, a chip enable signal CS1 for the flash EEPRM 100 is generated, and boot block access through this window is enabled.

The boot block transfer routine of the ROM 201 is then executed to set the program control flag (PRG) of "1" in the flash memory control register 501, and the power supply voltage VPP of 12 V is applied to the flash EEPROM 100 as the program power supply voltage PROG. A new boot block stored in the ROM 201 is transferred to the flash EEPROM 100 as writing data, and the program of the flash EEPROM 100 is started. As a result, the content tent of the boot block area of the flash EEPROM 100 is rewritten (step C11).

Upon rewriting the flash EEPROM 100, a prompt for causing the user to turn off the power switch, detaching the boot block rewriting unit 144, and turning on the power switch again is displayed (step C13). The operator follows the displayed prompt, and normal system initialization using the new boot block can be performed.

Even if the boot block rewriting unit 144 is kept mounted, the master signal detector 507 can be reset, provided that the system BIOS enable flag of "1" is set in the system ROM enable register 502. For this reason, normal system initialization using a new boot block can be performed. The system BIOS enable flag can be reset by, e.g., a program, stored in the ROM 201, for setting the system BIOS enable flag upon rewriting the boot block.

As described above, according to this embodiment, when the boot block rewriting unit is connected to the system bus 110 through the expansion bus connector 143, access to the flash EEPROM 100 through the address range of F000H to FFFFFH is disabled. Even if a system address belonging to the address range of F000H to FFFFFH is generated, the flash EEPROM 100 is not accessed. Instead, the ROM 201 of the boot block rewriting unit 144 is accessed. The program stored in the ROM 201 is then executed by the CPU 111 to start rewriting the boot block area. In this case, the boot block area of the flash EEPROM 100 is remapped to the address range of EC00H to EFFFFH by A16 inversion so as not to overlap the address of the ROM 201. The boot block area is then write-accessed through the remapped address range. Even if the boot block as the program executed first in system initialization is destroyed, the content of the boot block can be repaired without replacing the flash EEPROM 100 with a new one.

In this embodiment, a new boot block is stored in the ROM 201. However, a new boot block may be transferred from an FDD or the like to the flash EEPROM, provided that only a transfer program is stored in the ROM 201.

As has been described above, according to the present invention, when an EEPROM program executed first in system initialization is destroyed or information stored in the EEPROM is to be upgraded, this program can be repaired without replacing this EEPROM with a new one. That is, even if the content stored in the boot block is destroyed to disable initialization of the system, the boot block rewriting unit 144 can be connected to the expansion bus connector 143 to repair the destroyed boot block, and the system can be initialized.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A computer system comprising:

a keyboard having a plurality of keys;

a main memory storing programs and data currently in use;

a first memory having a main block for storing a boot program for bootstrapping said computer system and basic input/output programs for controlling hardware, and a boot block for storing key depression detecting means for detecting depression of a predetermined key of said keyboard;

a removable second memory storing a rewriting program for rewriting a content of the main block; and rewriting means, coupled to said keyboard, said main memory, said first memory, and said second memory, for, when said computer system is turned on, detecting depression of said predetermined key of said keyboard according to the key depression detecting means;

loading the rewriting program from said second memory to said main memory when the depression of the predetermined key is detected, and rewriting the boot program and the basic input/output programs in the main block according to the loaded rewriting program.

2. A system according to claim 1, wherein the main block is assigned to a first address range, the boot block is assigned to a second address range, and said computer system further comprises address converting means for converting the second address range to the first address range and masking the boot block when depression of the predetermined key is not detected.

3. A system according to claim 2, wherein said converting means executes the boot program in the main block after the address conversion is completed.

4. A system according to claim 1, wherein said first memory includes an EEPROM (Electrically Erasable and Programmable Read Only Memory).

5. A system according to claim 1, wherein said second memory includes a floppy disk.

6. A system according to claim 1, wherein the main block stores first type information representing a type of said system;

said second memory stores second information representing a type of a computer system by which the stored rewriting program is executable; and said rewriting means includes means for comparing the first type information with the second type information, and loads the rewriting program from said second memory to said main memory when depression of the predetermined key is detected and the first type information coincides with the second type information.

7. A system according to claim 1, wherein said rewriting means includes:

means for determining that said second memory stores a predetermined program when the depression of said predetermined key is detected;

means for loading the rewriting program of said second memory in said main memory when it is determined that the predetermined program is stored in said second memory; and means for informing that said second memory does not store said predetermined program to an operator of said system when it is determined that the predetermined program is not stored in said second memory.

8. A system according to claim 1, wherein said rewriting means initializes said computer system so as to rewrite the boot program and the basic input/output programs when depression of the predetermined key is detected.

9. A computer system comprising:

a keyboard having a plurality of keys;

a main memory storing programs and data currently in use;

a first memory having a main block for storing a boot program for bootstrapping said computer system and basic input/output programs for controlling hardware, and a boot block for storing check means for performing error detection of the main block and key depression detecting means for detecting depression of a predetermined key of said keyboard;

a removable second memory storing a rewriting program for rewriting a content of the main block; and rewriting means, coupled to said keyboard, said main memory, said first memory, and said second memory, for detecting an error of the main block according to the check means when said computer system is turned on, detecting depression of said predetermined key of said keyboard according to the key depression detecting means when the error of the main block is not detected, loading the rewriting program from said second memory to said main memory when error of the main block is detected or depression of the predetermined key is detected, and rewriting the boot program and the basic input/output programs in the main block according to the loaded rewriting program.

10. A system according to claim 9, wherein said first memory includes an EEPROM (Electrically Erasable and Programmable Read Only Memory).

11. A system according to claim 9, wherein said second memory includes a floppy disk.

12. A system according to claim 9, wherein the main block stores first type information representing a type of said system;

said second memory stores second type information representing a type of a computer system by which the stored program is executable; and said rewriting means includes means for comparing the first type information with the second type information, and loads the rewriting program from said second memory to said main memory when depression of the predetermined key is detected and the first type information coincides with the second type information.

13. A system according to claim 9, wherein said rewriting means includes:

means for determining that a predetermined program is stored in said second memory when error of the main block is detected or the depression of said predetermined key is detected;

means for loading the rewriting program of said second memory in said main memory when it is determined that the predetermined program is stored in said second memory; and means for informing that said second memory does not store said predetermined program to an operator of said system when it is determined that the predetermined program is not stored in said second memory.

14. A computer system comprising:

a system bus;

a memory including a boot area which is mapped to a first predetermined address range of a system address space and stores a program group executed in bootstrapping said computer system;

output means for outputting a reset signal to said system bus when said computer system is turned on;

a memory unit, having a memory area mapped to the same first address range as that of the boot area and detachable from said system bus, the memory area storing a rewriting program for rewriting a content of the boot area, for receiving the reset signal output from said output means via said system bus and outputting a master signal in response to reception of the reset signal;

starting means for starting execution of the rewriting program in response to the output master signal;

remapping means for remapping the boot area of said memory to a second predetermined address range different from the first address range according to the executed rewriting program;

enabling means for enabling said memory to access to the boot area on the second address range according to the executed rewriting program; and rewriting means for rewriting the content of the boot area according to the executed rewriting program.

15. A system according to claim 14, wherein said memory includes an EEPROM (Electrically Erasable and Programmable Read Only Memory).

16. A system according to claim 14, wherein said memory has a system BIOS area for storing basic input/output programs for controlling I/O (Input/Output) devices connected to said computer system, and the boot area stores a check program which is executed when said system is turned on and determines validity of the system BIOS area.

* * * * *